(12) United States Patent
Wu et al.

(10) Patent No.: US 11,909,683 B2
(45) Date of Patent: Feb. 20, 2024

(54) METHOD AND DEVICE IN NODES USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI TUILUO COMMUNICATION TECHNOLOGY PARTNERSHIP (LIMITED PARTNERSHIP), Shanghai (CN)

( * ) Notice: Subject to any disclaimer, the term of this patent is extended or adjusted under 35 U.S.C. 154(b) by 139 days.

(21) Appl. No.: 17/588,288

(22) Filed: Jan. 30, 2022

(65) Prior Publication Data
US 2022/0247530 A1    Aug. 4, 2022

(30) Foreign Application Priority Data

Feb. 1, 2021 (CN) .......................... 202110133124.7
Nov. 17, 2021 (CN) .......................... 202111359545.8

(51) Int. Cl.
*H04W 52/06* (2009.01)
*H04L 5/00* (2006.01)

(52) U.S. Cl.
CPC ........... *H04L 5/0048* (2013.01); *H04W 52/06* (2013.01)

(58) Field of Classification Search
CPC ...... H04W 52/00; H04W 52/04; H04W 52/06
See application file for complete search history.

(56) References Cited

U.S. PATENT DOCUMENTS

2015/0085692 A1*  3/2015  Wang .................... H04L 5/0048
370/252

FOREIGN PATENT DOCUMENTS

| CN | 110035484 A | 7/2019 |
|---|---|---|
| WO | 2013181783 A1 | 12/2013 |
| WO | 2020006277 A1 | 1/2020 |
| WO | 2020248147 A1 | 12/2020 |

OTHER PUBLICATIONS

First Office Action of Chinese patent application No. CN202111359545.8 dated Oct. 31, 2023.
First Search Report of Chinese patent application No. CN202111359545.8 dated Oct. 25, 2023.

* cited by examiner

*Primary Examiner* — James P Duffy

(57) ABSTRACT

The present disclosure provides a method and a device in a node used for wireless communications. A first node receives a first signaling; and transmits a first signal. The first signaling indicates scheduling information for the first signal; a linear value of transmit power for the first signal is equal to a product of a linear value of a second power and a first coefficient; the first signaling is used to determine a first reference signal resource and a first matrix; the first reference signal resource belongs to a first reference signal resource set of S reference signal resource sets; S matrix sets respectively correspond to the S reference signal resource sets. The above method optimizes the transmit power on each panel in the multi-panel-based uplink transmission.

20 Claims, 5 Drawing Sheets

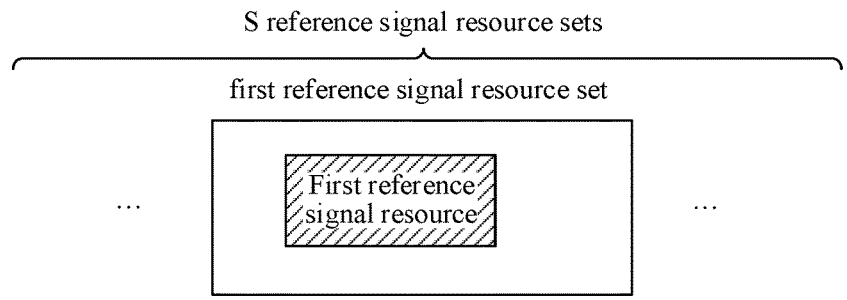
FIG. 6
Second power = min (first reference power, first power threshold)
FIG. 7
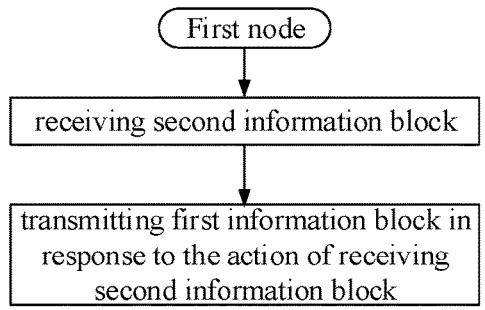
FIG. 8
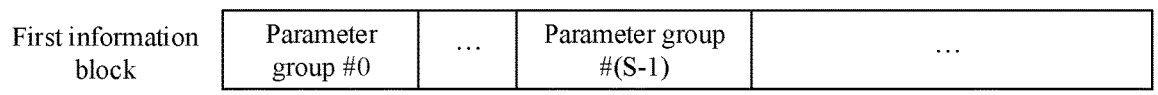
FIG. 9
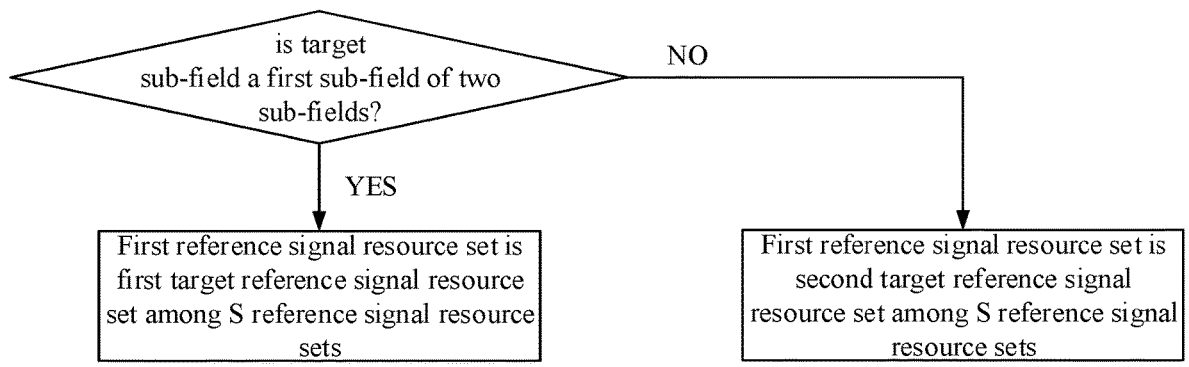
FIG. 10

METHOD AND DEVICE IN NODES USED FOR WIRELESS COMMUNICATION

CROSS REFERENCE TO RELATED APPLICATIONS

This application claims the priority benefit of Chinese Patent Application No. 202110133124.7, filed on Feb. 1, 2021, and the priority of benefit of Chinese Patent Application No. 202111359545.8, filed on Nov. 17, 2021, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

The Multi-antenna technique is a crucial part in the 3rd Generation Partner Project (3GPP) Long-term Evolution (LTE) and New Radio (NR) systems. More than one antenna can be configured, at the communication node, e.g., a base station or a User Equipment (UE), to obtain extra degree of freedom in space. Multiple antennas form through beamforming a beam pointing in a specific direction to enhance the communication quality. When the multiple antennas belong to multiple Transmitter Receiver Points (TRPs)/panels, spatial differences between TRPs/panels can be taken advantage of to obtain extra diversity gains. In NR Release (R)16, multi-TRP based transmission is used to increase the reliability of downlink physical layer data channel transmission.

Codebook-based uplink transmission is a means of multi-antenna transmission commonly seen in LTE and NR systems. A base station determines a precoding matrix through an uplink reference signal and indicates the precoding matrix in a scheduling signaling. A UE adopts the precoding matrix to precode uplink transmission so as to acquire multi-antenna diversity and/or multiplexing gains. In NR system, different antenna ports at the UE side are nonCoherent, partialNonCoherent or fullCoherent. The operation of precoding cannot be performed between non-coherent antenna ports, so that the UE will only use partial antenna ports when performing low-rank uplink transmissions.

SUMMARY

When a number of non-zero power antenna ports used for transmitting a Physical Uplink Shared Channel (PUSCH) is smaller than a total number of antenna ports, the UE cannot transmit the PUSCH with full power, as defined in NR R15. In NR R16, however, the UE is allowed to report a precoding matrix set based on its own power, so, when a precoding matrix in the precoding matrix set is adopted, the UE will be able to transmit with full power even if the number of non-zero power antenna ports used for transmitting the PUSCH is smaller than the total number of antenna ports.

In NR R17 and subsequent versions, the multi-TRP/panel-based transmission scheme will proceed evolution, including being used for advancement of uplink physical layer data channel. Inventors find through researches that different panels may be configured with different antennas and corresponding to different UE capabilities, therefore, if the technique of multi-panel is introduced in uplink transmission, how to optimize the uplink transmit power according to the UE capability for each panel seems an urgent issue to be addressed.

To address the above problem, the present disclosure provides a solution. It should be noted that though the present disclosure only took the cellular network, multi-TRP/panel scenario and codebook-based uplink transmission for example in the statement above, it is also applicable to other scenarios like Vehicle-to-Everything (V2X), single-TRP/panel scenarios and non-codebook based uplink transmission, where similar technical effects can be achieved. Additionally, the adoption of a unified solution for various scenarios, including but not limited to cellular networks, V2X, multi-TRP/panel transmission, single-TRP/panel transmission, codebook-based uplink transmission and non-codebook based uplink transmission, contributes to the reduction of hardcore complexity and costs. In the case of no conflict, the embodiments of a first node and the characteristics in the embodiments may be applied to a second node, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first signaling; and
  transmitting a first signal;
  herein, the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

In one embodiment, a problem to be solved in the present disclosure includes: how to optimize the uplink transmit power on each panel when in an uplink transmission based on multiple TRPs/panels. By proposing a precoding matrix set supporting full-power transmission which is determined for each panel, the problem is addressed.

In one embodiment, characteristics of the above method include: the S reference signal resource sets respectively correspond to different UE capabilities and different full-power precoding matrix sets. The S matrix sets are respectively S full-power precoding matrix sets corresponding to the S reference signal resource sets.

In one embodiment, an advantage of the above method includes: optimizing the transmit power for each panel in respective uplink transmission.

According to one aspect of the present disclosure, characterized in comprising:
 transmitting a first information block;
 herein, the first information block indicates the S matrix sets.

According to one aspect of the present disclosure, characterized in comprising:
 receiving a second information block;
 herein, as a response to the behavior of receiving the second information block, the first node transmits the first information block.

According to one aspect of the present disclosure, wherein the first signaling comprises a first field, and the first field in the first signaling comprises two sub-fields; a target sub-field of the two sub-fields in the first signaling indicates the first reference signal resource; a position of the target sub-field in the two sub-fields is used to determine the first matrix set, any of the two sub-fields comprising at least one bit.

In one embodiment, an advantage of the above method includes: indicating the first matrix set implicitly, thus reducing signaling overhead.

According to one aspect of the present disclosure, wherein when the first matrix belongs to the first matrix set, the first coefficient is equal to 1; when the first matrix does not belong to the first matrix set, the first coefficient is equal to a ratio of a second port number to a first port number, the second port number and the first port number respectively being positive integers; the second port number is equal to a number of non-zero power transmission antenna ports of a PUSCH bearing the first signal, while the first port number is associated with the first reference signal resource.

According to one aspect of the present disclosure, wherein the first information block comprises S information sub-blocks, the S information sub-blocks being sequentially arranged in the first information block; the S information sub-blocks respectively indicate the S matrix sets; a first information sub-block among the S information sub-blocks indicates the first matrix set; the S reference signal resource sets are sequentially arranged; a position of the first information sub-block in the S information sub-blocks is the same as a position of the first reference signal resource set in the S reference signal resource sets.

In one embodiment, an advantage of the above method is to build one-to-one correspondence between the S matrix sets and the S reference signal resource sets implicitly to conserve signaling overhead.

According to one aspect of the present disclosure, wherein the first signal comprises L sub-signals, L being a positive integer greater than 1; the L sub-signals occupy same time-frequency resources; there are two sub-signals among the L sub-signals that have different transmit powers.

According to one aspect of the present disclosure, the first node is a UE.

According to one aspect of the present disclosure, the first node is a relay node.

The present disclosure provides a method in a second node for wireless communications, comprising:
 transmitting a first signaling; and
 receiving a first signal;
 herein, the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

According to one aspect of the present disclosure, characterized in comprising:
 receiving a first information block;
 herein, the first information block indicates the S matrix sets.

According to one aspect of the present disclosure, characterized in comprising:
 transmitting a second information block;
 herein, as a response to the behavior of receiving the second information block, a transmitter for the first signal transmits the first information block.

According to one aspect of the present disclosure, wherein the first signaling comprises a first field, and the first field in the first signaling comprises two sub-fields; a target sub-field of the two sub-fields in the first signaling indicates the first reference signal resource; a position of the target sub-field in the two sub-fields is used to determine the first matrix set, any of the two sub-fields comprising at least one bit.

According to one aspect of the present disclosure, wherein when the first matrix belongs to the first matrix set, the first coefficient is equal to 1; when the first matrix does not belong to the first matrix set, the first coefficient is equal to a ratio of a second port number to a first port number, the second port number and the first port number respectively being positive integers; the second port number is equal to a number of non-zero power transmission antenna ports of a PUSCH bearing the first signal, while the first port number is associated with the first reference signal resource.

According to one aspect of the present disclosure, wherein the first information block comprises S information sub-blocks, the S information sub-blocks being sequentially arranged in the first information block; the S information sub-blocks respectively indicate the S matrix sets; a first information sub-block among the S information sub-blocks indicates the first matrix set; the S reference signal resource sets are sequentially arranged; a position of the first information sub-block in the S information sub-blocks is the same as a position of the first reference signal resource set in the S reference signal resource sets.

According to one aspect of the present disclosure, wherein the first signal comprises L sub-signals, L being a positive integer greater than 1; the L sub-signals occupy same time-frequency resources; there are two sub-signals among the L sub-signals that have different transmit powers.

According to one aspect of the present disclosure, the second node is a base station.

According to one aspect of the present disclosure, the second node is a UE.

According to one aspect of the present disclosure, the second node is a relay node.

The present disclosure provides a first node for wireless communications, comprising:

a first receiver, receiving a first signaling; and a first transmitter, transmitting a first signal;

herein, the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

The present disclosure provides a second node for wireless communications, comprising:

a second transmitter, transmitting a first signaling; and a second receiver, receiving a first signal;

herein, the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

In one embodiment, compared with the prior art, the present disclosure is advantageous in the following aspects:

optimizing the uplink transmit power for each panel in a multi-panel-based uplink transmission;

reducing the signaling overhead by establishing corresponding relationships between multiple panels and multiple full-power TPMI sets in an implicit way.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first reference signal resource, a first reference signal resource set and S reference signal resource sets according to one embodiment of the present disclosure.

FIG. 7 illustrates a schematic diagram of a second power according to one embodiment of the present disclosure.

FIG. 8 illustrates a schematic diagram of a first node receiving a second information block and transmitting a first information block according to one embodiment of the present disclosure.

FIG. 9 illustrates a schematic diagram of a first information block according to one embodiment of the present disclosure.

FIG. 10 illustrates a schematic diagram of a target sub-field's position in two sub-fields used to determine a first matrix set according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
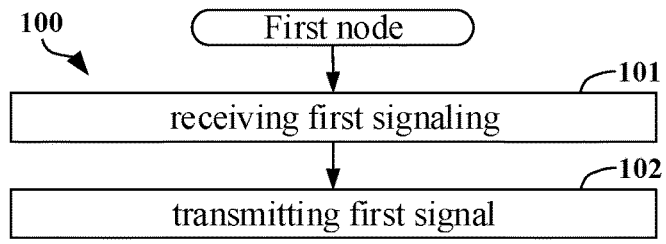
FIG. 1 illustrates a flowchart of a first signaling and a first signal according to one embodiment of the present disclosure.

Embodiment 1 illustrates a flowchart of transmission of a first signaling and a first signal according to one embodiment of the present disclosure, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present disclosure receives a first signaling in step 101; and transmits a first signal in step 102. Herein, the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

In one embodiment, the first node is configured with a first higher-layer parameter which is set to "codebook".

In one subembodiment, the first higher-layer parameter is txConfig.

In one subembodiment, names of the first higher-layer parameter include "txConfig".

In one subembodiment, the first higher-layer parameter comprises information contained in a txConfig field in a PUSCH-Config Information Element (IE).

In one embodiment, the first node is configured with S first higher-layer parameters, the S first higher-layer parameters respectively corresponding to the S reference signal resource sets; the S first higher-layer parameters are all set to "codebook".

In one subembodiment, names of each of the S first higher-layer parameters include "txConfig".

In one embodiment, the first node is configured with a second higher-layer parameter which is set to "fullpowerMode2".

In one subembodiment, the second higher-layer parameter is ul-FullPowerTmnsmission.

In one subembodiment, names of the second higher-layer parameter include "FullPower".

In one subembodiment, names of the second higher-layer parameter include "FullPowerTransmission".

In one subembodiment, the second higher-layer parameter comprises information contained in a ul-FullPowerTransmission-r16 field in PUSCH-Config IE.

In one embodiment, the first node is configured with S second-type higher-layer parameters, the S second-type higher-layer parameters respectively corresponding to the S reference signal resource sets; each of the S second-type higher-layer parameters is set to "fullpowerMode2", and the second higher-layer parameter is one of the S second-type higher-layer parameters that corresponds to the first reference signal resource set.

In one subembodiment, names of each of the S second-type higher-layer parameters include "FullPower".

In one subembodiment, names of each of the S second-type higher-layer parameters include "FullPowerTransmission".

In one embodiment, the first signaling comprises a physical-layer signaling.

In one embodiment, the first signaling is a physical layer signaling.

In one embodiment, the first signaling comprises a dynamic signaling.

In one embodiment, the first signaling comprises a layer 1 (L1) signaling.

In one embodiment, the first signaling is a layer 1 (L1) signaling.

In one embodiment, the first signaling comprises a layer 1 (L1) control signaling.

In one embodiment, the first signaling comprises Downlink Control Information (DCI).

In one embodiment, the first signaling is DCI.

In one embodiment, the first signaling comprises UpLink Grant DCI.

In one embodiment, the first signaling is UpLink Grant DCI.

In one embodiment, the first signaling comprises a Radio Resource Control (RRC) signaling.

In one embodiment, the first signaling comprises a Medium Access Control layer Control Element (MAC CE) signaling.

In one embodiment, the first signal comprises a baseband signal.

In one embodiment, the first signal comprises a radio signal.

In one embodiment, the first signal comprises a radio frequency signal.

In one embodiment, the first signal carries at least one of a Transport Block (TB), a Code Block (CB) or a Code Block Group (CBG).

In one embodiment, the first signal carries Uplink control information (UCI).

In one embodiment, the first signal comprises DeModulation Reference Signals (DMRS).

In one embodiment, the scheduling information comprises one or more of time-domain resource, frequency-domain resource, a Modulation and Coding Scheme (MCS), a DMRS port, a Hybrid Automatic Repeat reQuest (HARQ) process number, a Redundancy Version (RV) or a New Data Indicator (NDI).

In one embodiment, the first signaling comprises the scheduling information for the first signal.

In one embodiment, the first signaling explicitly indicates the scheduling information for the first signal.

In one embodiment, the first signaling implicitly indicates the scheduling information for the first signal.

In one embodiment, the first signaling explicitly indicates part of the scheduling information for the first signal, and implicitly indicates the rest of the scheduling information for the first signal.

In one embodiment, the first signaling indicates the first matrix.

In one embodiment, the first signaling indicates an index of the first matrix; the index of the first matrix is a Transmitted Precoding Matrix Indicator (TPMI).

In one embodiment, the first signaling indicates a first TPMI, the first TPMI being used to determine the first matrix.

In one subembodiment, the first TPMI is a TPMI for the first matrix.

In one embodiment, the first signaling comprises a third field, and the third field in the first signaling indicates the first matrix; the third field comprises at least one bit.

In one embodiment, the third field comprises all or partial information in a field of Precoding information and number of layers.

In one embodiment, the third field in the first signaling indicates the first TPMI.

In one embodiment, the third field in the first signaling indicates a first rank number, the first rank number being a number of layers of the first signal; the first rank number is a positive integer.

In one embodiment, the third field in the first signaling indicates the first rank number and the first TPMI.

In one embodiment, the TPMI is obtained through look-up of values of the third field in the first signaling.

In one embodiment, the first rank number and the TPMI is obtained through look-up of values of the third field in the first signaling.

In one embodiment, the first reference signal resource has W1 reference signal ports, W1 being a positive integer greater than 1; the third field in the first signaling indicates the first matrix from a first table; the W1, the second higher-layer parameter, a third higher-layer parameter, a fourth higher-layer parameter and a fifth higher-layer parameter are jointly used to determine the first table.

In one embodiment, the first table comprises two columns and more than one row, a value of the third field in the first signaling is used to determine a target row in the first table, with a first column in the target row being equal to the value of the third field in the first signaling, while a second column in the target row indicating the first rank number and the first TPMI.

In one embodiment, the first table comprises all or partial content in one Table among Table 7.3.1.1.2-2, Table 7.3.1.1.2-2A, Table 7.3.1.1.2-2B, Table 7.3.1.1.2-3, Table 7.3.1.1.2-3A, Table 7.3.1.1.2-4, Table 7.3.1.1.2-4A, Table 7.3.1.1.2-5, or Table 7.3.1.1.2-5A.

In one embodiment, the third higher-layer parameter comprises content in a higher-layer parameter transformPrecoder.

In one embodiment, names of the third higher-layer parameter include "transformPrecoder".

In one embodiment, the third higher-layer parameter is a higher-layer parameter transformPrecoder.

In one embodiment, the value of the third higher-layer parameter is one of "enabled" or "disabled".

In one embodiment, the fourth higher-layer parameter comprises content in a higher-layer parameter maxRank.

In one embodiment, names of the fourth higher-layer parameter include "maxRank".

In one embodiment, the fourth higher-layer parameter is a higher-layer parameter maxRank.

In one embodiment, the value of the fourth higher-layer parameter is a positive integer no greater than 4.

In one embodiment, the fifth higher-layer parameter comprises content in a higher-layer parameter codebookSubset.

In one embodiment, names of the fifth higher-layer parameter include "codebookSubset".

In one embodiment, the fifth higher-layer parameter is a higher-layer parameter codebookSubset.

In one embodiment, the value of the fifth higher-layer parameter is one of "fullyAndPartialAndNonCoherent", "partialAndNonCoherent" or "noncoherent".

In one embodiment, the first TPMI is used to determine the first matrix in a second Table; the W1, the first rank number and a third higher-layer parameter are jointly used to determine the second Table.

In one embodiment, the number of antenna ports corresponding to the second Table is equal to the W1.

In one embodiment, the second Table comprises all content in a Table among Table 6.3.1.5-1~Table 6.3.1.5-7 in 3GPP TS38.211.

In one embodiment, S third-type higher-layer parameters respectively correspond to the S reference signal resource sets; the third higher-layer parameter is one of the S third-type higher-layer parameters corresponding to the first reference signal resource set.

In one embodiment, S fourth-type higher-layer parameters respectively correspond to the S reference signal resource sets; the fourth higher-layer parameter is one of the S fourth-type higher-layer parameters corresponding to the first reference signal resource set.

In one embodiment, S fifth-type higher-layer parameters respectively correspond to the S reference signal resource sets; the fifth higher-layer parameter is one of the S fifth-type higher-layer parameters corresponding to the first reference signal resource set.

In one embodiment, the first matrix is a precoder for the first signal.

In one embodiment, the first matrix is used for precoding of the first signal.

In one embodiment, the first matrix is a vector.

In one embodiment, the first matrix only comprises one column.

In one embodiment, the first matrix comprises more than one column.

In one embodiment, a number of columns in the first matrix is equal to the first rank number.

In one embodiment, a number of rows in the first matrix is equal to the W1.

In one embodiment, the first signal comprises one layer; the first matrix is applied in the layer corresponding to the first reference signal resource.

In one subembodiment, the first reference signal resource has W1 reference signal ports, W1 being a positive integer greater than 1; the first matrix comprises W1 rows, and any of the W1 rows comprises one element; symbols in the layer comprised in the first signal are respectively weighted by one element comprised by the W1 rows and then mapped onto antenna ports corresponding to the W1 reference signal ports.

In one embodiment, the first signal comprises V layers, where V is a positive integer greater than 1; the first matrix is applied in the V layers corresponding to the first reference signal resource.

In one subembodiment, the first reference signal resource has W1 reference signal ports, W1 being a positive integer greater than 1; the first matrix comprises W1 rows, and any of the W1 rows comprises V elements; the W1 rows respectively correspond to the W1 reference signal ports; a given port is an antenna port corresponding to any reference signal port among the W1 reference signal ports, symbols in the V layers comprised in the first signal are respectively weighted by V elements comprised by a row corresponding to the given port, summed up, and then mapped onto the given port.

In one embodiment, the symbol is a complex symbol.

In one embodiment, the symbol is a complex modulated symbol.

In one embodiment, the first matrix set only comprises one matrix.

In one embodiment, the first matrix set comprises more than one matrix.

In one embodiment, there is one matrix in the first matrix set that is a vector.

In one embodiment, there is one matrix in the first matrix set in which the number of column(s) is equal to 1.

In one embodiment, any matrix in the first matrix set is a precoding matrix.

In one embodiment, there are two matrixes in the first matrix set which comprise different numbers of rows.

In one embodiment, there are two matrixes in the first matrix set which comprise different numbers of columns.

In one embodiment, there are two matrixes in the first matrix set which comprise the same number of rows.

In one embodiment, there are two matrixes in the first matrix set which comprise the same number of columns.

In one embodiment, the number of rows in any matrix in the first matrix set is no greater than 4.

In one embodiment, any matrix in any of the S matrix sets is a precoding matrix.

In one embodiment, there is a matrix set among the S matrix sets that only comprises one matrix.

In one embodiment, there is a matrix set among the S matrix sets that comprises more than one matrix.

In one embodiment, there is one matrix in the S matrix sets that is a vector.

In one embodiment, there is one matrix in the S matrix sets in which the number of column(s) is equal to 1.

In one embodiment, there is a matrix set among the S matrix sets in which any two matrixes have equal numbers of rows.

In one embodiment, there is a matrix set among the S matrix sets in which there are two matrixes having unequal numbers of rows.

In one embodiment, any matrix in any of the S matrix sets comprises at least one all-zero row.

In one embodiment, a number of non-zero element(s) comprised in any column of any given matrix in the S matrix sets is smaller than a number of rows in the any given matrix.

In one embodiment, the number of rows in any matrix in the S matrix sets is no greater than 4.

In one embodiment, there are two matrixes having equal numbers of rows that belong to two different matrix sets respectively among the S matrix sets.

In one embodiment, a first given matrix set and a second given matrix set are respectively two matrix sets among the S matrix sets; the first given matrix set comprises a first given matrix; the second given matrix set comprises at least one matrix in which the number of rows is equal to that comprised in the first given matrix, the second given matrix set not comprising the first given matrix.

In one embodiment, a first given matrix set and a second given matrix set are respectively two matrix sets among the S matrix sets; the first given matrix set comprises a first given matrix; the second given matrix set comprises at least one matrix in which the number of rows and the number of columns are respectively equal to those comprised in the first given matrix, the second given matrix set not comprising the first given matrix.

In one embodiment, the first given matrix set and the second given matrix set are respectively any two matrix sets among the S matrix sets.

In one embodiment, the spatial relation comprises a Transmission Configuration Indicator (TCI) state.

In one embodiment, the spatial relation comprises Quasi-Co-Location (QCL) assumption.

In one embodiment, the spatial relation comprises a QCL parameter.

In one embodiment, the spatial relation comprises a spatial domain filter.

In one embodiment, the spatial relation comprises a spatial domain transmission filter.

In one embodiment, the spatial relation comprises a spatial domain receive filter.

In one embodiment, the spatial relation comprises large-scale properties.

In one embodiment, the spatial relation comprises antenna port(s).

In one embodiment, the spatial relation comprises precoding.

In one embodiment, the phrase that the first reference signal resource is used to determine a spatial relation of the first signal has a meaning that: the first node transmits the first reference signal resource and the first signal using a same spatial domain filter.

In one embodiment, the phrase that the first reference signal resource is used to determine a spatial relation of the first signal has a meaning that: the first node transmits a reference signal in the first reference signal resource and transmits the first signal using a same spatial domain filter.

In one embodiment, the phrase that the first reference signal resource is used to determine a spatial relation of the first signal has a meaning that: the first node receives a reference signal in the first reference signal resource and transmits the first signal using a same spatial domain filter.

In one embodiment, the phrase that the first reference signal resource is used to determine a spatial relation of the first signal has a meaning that: large-scale properties of a channel that the first signal goes through can be inferred from large-scale properties of a channel that a reference signal transmitted in the first reference signal resource goes through.

In one embodiment, the phrase that the first reference signal resource is used to determine a spatial relation of the first signal has a meaning that: the first reference signal resource is used to determine a transmission antenna port for the first signal.

In one embodiment, the phrase that the first reference signal resource is used to determine a spatial relation of the first signal has a meaning that: the first signal is transmitted by a same antenna port as an SRS port for the first reference signal resource.

In one embodiment, the phrase that the first reference signal resource is used to determine a spatial relation of the first signal has a meaning that: the first reference signal resource is used to determine a precoder for the first signal.

In one embodiment, the first signal comprises one layer; the phrase that the first reference signal resource is used to determine a spatial relation of the first signal has a meaning that: the first matrix is applied in the layer corresponding to the first reference signal resource.

In one embodiment, the first signal comprises V layers, where V is a positive integer greater than 1; the phrase that the first reference signal resource is used to determine a spatial relation of the first signal has a meaning that: the first matrix is applied in the V layers corresponding to the first reference signal resource.

In one embodiment, the first coefficient is a positive real number no greater than 1.

In one embodiment, a value of the first coefficient in a case when the first matrix belongs to the first matrix set is unequal to that in a case when the first matrix does not belong to the first matrix set.

In one embodiment, for any given reference signal resource in the S reference signal resource sets, a reference information block is used to indicate configuration information for the given reference signal resource; the reference information block indicates a matrix set corresponding to the given reference signal among the S matrix sets.

In one subembodiment, any reference signal resource set of the S reference signal resource sets is composed of reference signal resources corresponding to a same matrix set among the S matrix sets.

In one subembodiment, the reference information block is borne by an RRC signaling.

In one subembodiment, the reference information block comprises all or partial information in an srs-ResourceToAddModList field in an SRS-Config IE.

In one embodiment, configuration information for a reference signal resource comprises at least one of time-domain resource, frequency-domain resource, code-domain resource, the number of ports, cyclic shift or an Orthogonal Cover Code (OCC).

Embodiment 2

Figure 2:
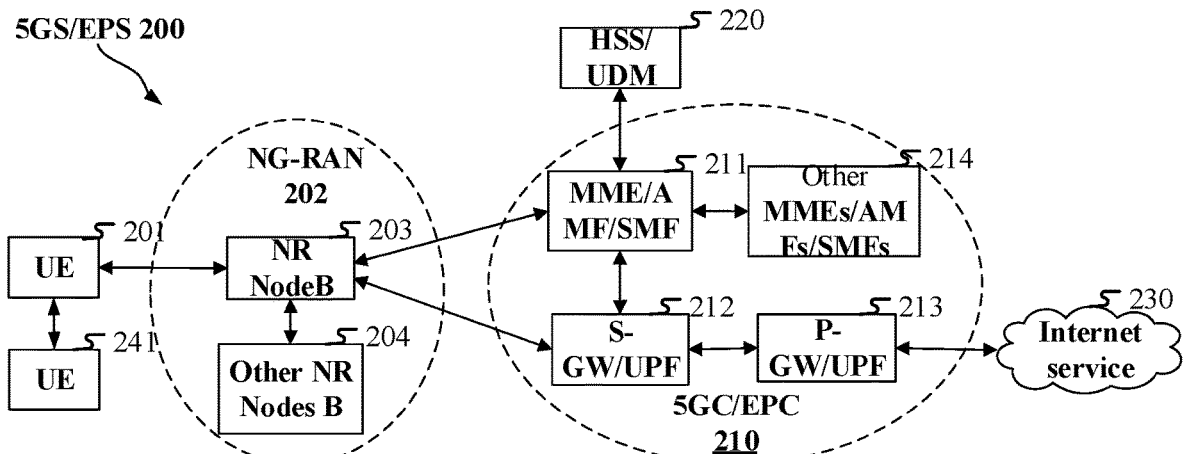
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The NR 5G or LTE network architecture may be called a 5G System/Evolved Packet System (5GS/EPS) 200 or other appropriate terms. The 5GS/EPS 200 may comprise one or more UEs 201, a UE 241 in sidelink communication with the UE(s) 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present disclosure includes the UE 201.

In one embodiment, the second node in the present disclosure includes the gNB 203.

In one embodiment, a radio link between the UE 201 and the gNB 203 is a cellular link.

In one embodiment, a transmitter for the first signaling in the present disclosure includes the gNB 203.

In one embodiment, a receiver for the first signaling in the present disclosure includes the UE 201.

In one embodiment, a transmitter for the first signal in the present disclosure includes the UE 201.

In one embodiment, a receiver for the first signal in the present disclosure includes the gNB 203.

Embodiment 3

Figure 3:
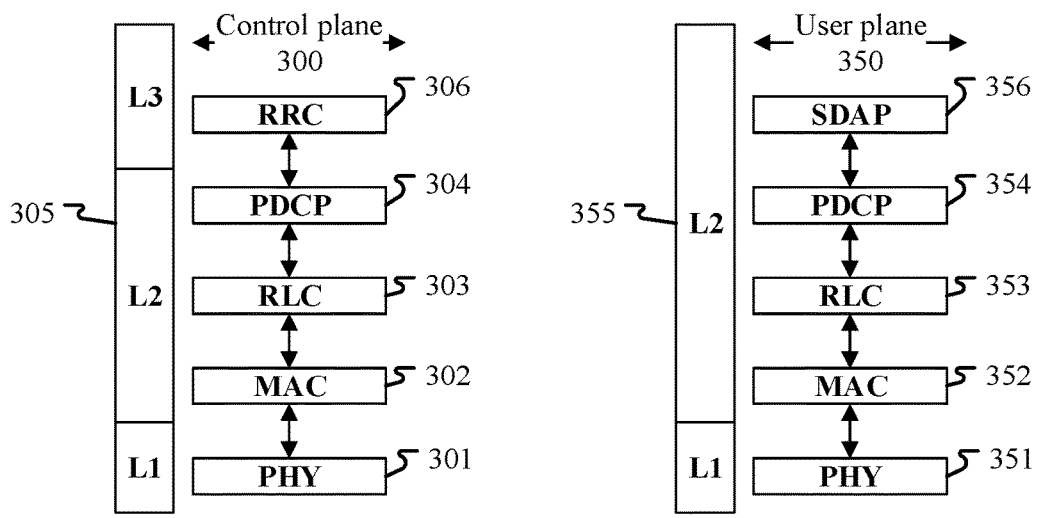
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure.

The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling is generated by the PHY 301, or the PHY 351.

In one embodiment, the first signaling is generated by the MAC sublayer 352, or the MAC sublayer 302.

In one embodiment, the first signal is generated by the PHY 301, or the PHY 351.

Embodiment 4

Figure 4:
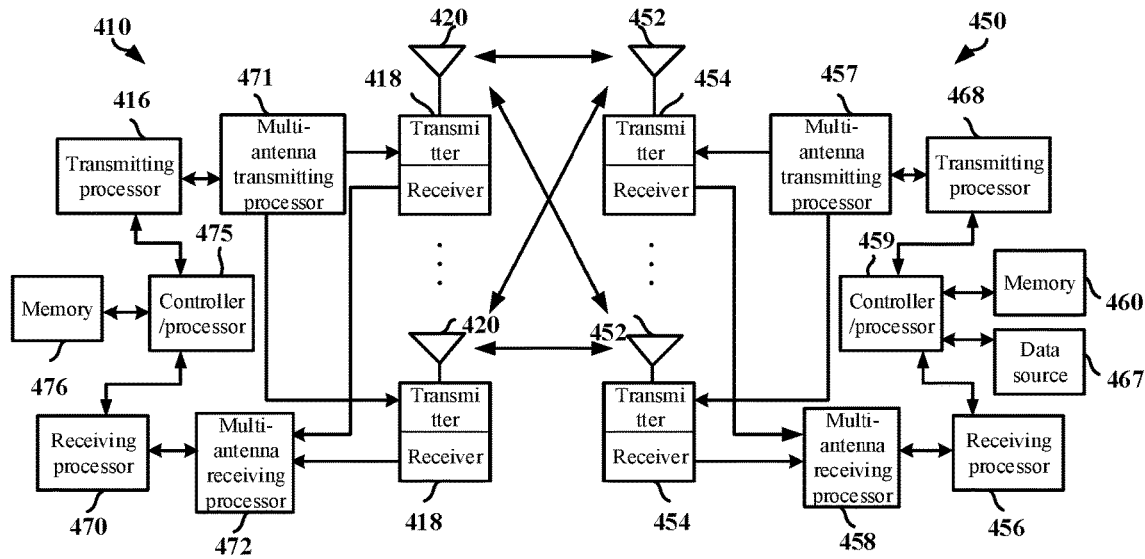
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication node 450 comprises at least one processor and at least one memory, the at least one memory comprises computer program codes; the at least one memory and the computer program codes are configured to be used in collaboration with the at least one processor. The second communication device 450 at least: receives the first signaling; and transmits the first signal.

In one embodiment, the second communication node 450 comprises a memory that stores a computer readable instruction program, the computer readable instruction program generates actions when executed by at least one processor, which include: receiving the first signaling; and transmitting the first signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits the first signaling; and receives the first signal.

In one embodiment, the first communication device 410 comprises a memory that stores a computer readable instruction program, the computer readable instruction program generates actions when executed by at least one processor, which include: transmitting the first signaling; and receiving the first signal.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling; at least one of the antenna 420, the transmitter 418, the transmitting processor 416, the multi-antenna transmitting processor 471, the controller/processor 475 or the memory 476 is used to transmit the first signaling.

In one embodiment, at least one of the antenna 420, the receiver 418, the receiving processor 470, the multi-antenna receiving processor 472, the controller/processor 475 or the memory 476 is used to receive the first signal; at least one of the antenna 452, the transmitter 454, the transmitting processor 468, the multi-antenna transmitting processor 457, the controller/processor 459 or the memory 460 is used to transmit the first signal.

In one embodiment, at least one of the antenna 420, the receiver 418, the receiving processor 470, the multi-antenna receiving processor 472, the controller/processor 475 or the memory 476 is used to receive the first information block; at least one of the antenna 452, the transmitter 454, the transmitting processor 468, the multi-antenna transmitting processor 457, the controller/processor 459 or the memory 460 is used to transmit the first information block.

In one embodiment, at least one of the antenna 452, the receiver 454, the receiving processor 456, the multi-antenna receiving processor 458, the controller/processor 459, the memory 460 or the data source 467 is used to receive the second information block; at least one of the antenna 420, the transmitter 418, the transmitting processor 416, the multi-antenna transmitting processor 471, the controller/processor 475 or the memory 476 is used to transmit the second information block.

Embodiment 5

Figure 5:
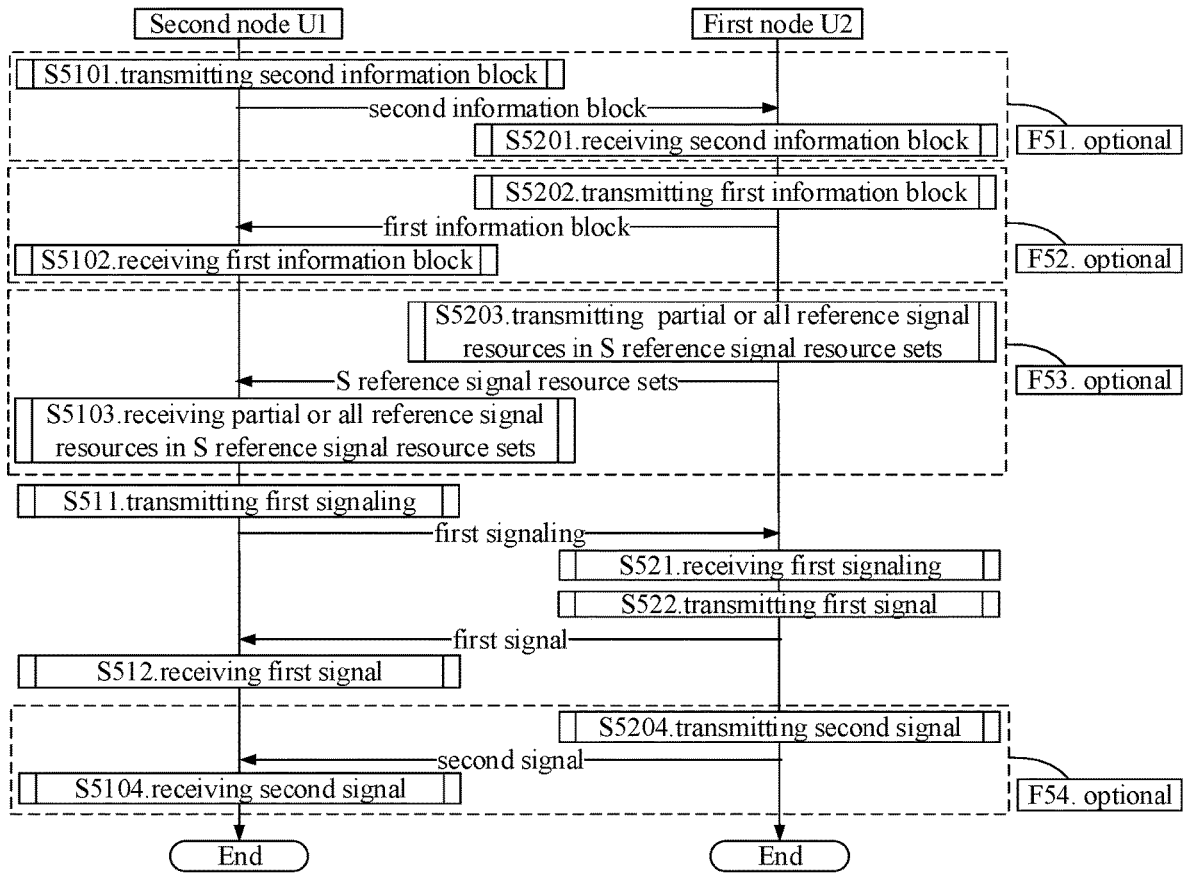
FIG. 5 illustrates a flowchart of transmission according to one embodiment of the present disclosure.

Embodiment 5 illustrates a flowchart of wireless transmission according to one embodiment of the present disclosure, as shown in FIG. 5. In FIG. 5, a second node U1 and a first node U2 are communication nodes in communications via an air interface. In FIG. 5, steps marked by boxes F51 to F54 are optional, respectively.

The second node U1 transmits a second information block in step S5101; receives a first information block in step S5102; receives some or all of reference signal resources in S reference signal resource sets in step S5103; transmits a first signaling in step S511; and receives a first signal in step S512; receives a second signal in step S5104.

The first node U2 receives a second information block in step S5201; transmits a first information block in step S5202; transmits some or all of reference signal resources in S reference signal resource sets in step S5203; and receives a first signaling in step S521; transmits a first signal in step S522; and transmits a second signal in step S5204.

In Embodiment 5, the first signaling is used by the first node U2 to determine scheduling information for the first signal; a transmit power for the first signal is a first power, and a linear value of the first power is equal to a product of a linear value of a second power and a first coefficient, the first coefficient being a non-negative real number; the first signaling is used by the first node U2 to determine a first reference signal resource and a first matrix; the first reference signal resource is used by the first node U2 to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used by the first node U2 to determine the first coefficient.

In one embodiment, the first node U2 is the first node in the present disclosure.

In one embodiment, the second node U1 is the second node in the present disclosure.

In one embodiment, an air interface between the second node U1 and the first node U2 includes a radio interface between a base station and a UE.

In one embodiment, an air interface between the second node U1 and the first node U2 includes a radio interface between a UE and another UE.

In one embodiment, the second node U1 is a maintenance base station for a serving cell of the first node U2.

In one embodiment, the first signaling is transmitted in a downlink physical layer control channel (i.e., a downlink channel only capable of bearing physical layer signaling).

In one embodiment, the first signaling is transmitted on a Physical Downlink Control Channel (PDCCH).

In one embodiment, the first signaling is transmitted in a downlink physical layer data channel (i.e., a downlink channel only capable of bearing physical layer data).

In one embodiment, the first signaling is transmitted in a Physical Downlink Shared CHannel (PDSCH).

In one embodiment, the first signal is transmitted on an uplink physical layer data channel (i.e., a downlink channel capable of bearing physical layer data).

In one embodiment, the first signal is transmitted on a Physical Uplink Shared Channel (PUSCH).

In one embodiment, the steps marked by the box F51 in FIG. 5 exist; as a response to the behavior of receiving the second information block, the first node U1 transmits the first information block.

In one embodiment, the second information block is transmitted on a PDSCH.

In one embodiment, a target receiver for the second information block includes a transmitter for the first signal.

In one embodiment, a target receiver for the second information block is a transmitter for the first signal.

In one embodiment, the steps marked by the box F52 in FIG. 5 exist; the first information block indicates the S matrix sets.

In one embodiment, the first information block explicitly indicates the S matrix sets.

In one embodiment, the first information block implicitly indicates the S matrix sets.

In one embodiment, the S matrix sets are used by the first node U2 to determine the first information block.

In one embodiment, the first information block is used by the second node U1 to determine the S matrix sets.

In one embodiment, the first information block is transmitted on a PDSCH.

In one embodiment, the first information block explicitly indicates the S matrix sets.

In one embodiment, the first information block implicitly indicates the S matrix sets.

In one embodiment, the first information block explicitly indicates part of the S matrix sets, and implicitly indicates the rest of the S matrix sets.

In one embodiment, the first information block indicates matrixes comprised in each of the S matrix sets from G0 candidate matrixes; G0 is a positive integer greater than 1, and the G0 candidate matrixes are pre-defined.

In one embodiment, the first information block indicates part of or all matrixes comprised in each of the S matrix sets by means of bitmap.

In one embodiment, the first information block indicates part of or all matrixes comprised in each of the S matrix sets by means of enumerating.

In one embodiment, the steps marked by the box F53 in FIG. 5 exist.

In one embodiment, the first node transmits all reference signal resources in the S reference signal resource sets.

In one embodiment, the first node transmits only some reference signal resources in the S reference signal resource sets.

In one embodiment, the second node receives all reference signal resources in the S reference signal resource sets.

In one embodiment, the second node receives only some reference signal resources in the S reference signal resource sets.

In one embodiment, the phrase of transmitting a reference signal resource comprises: transmitting a reference signal in the reference signal resource.

In one embodiment, the phrase of transmitting a reference signal resource comprises: transmitting a reference signal using code-domain resources of the reference signal resource in time-frequency resources of the reference signal resource.

In one embodiment, the phrase of receiving a reference signal resource comprises: receiving a reference signal in the reference signal resource.

In one embodiment, the phrase of receiving a reference signal resource comprises: receiving a reference signal using a code-domain resource of the reference signal resource in a time-frequency resource of the reference signal resource.

In one embodiment, the code-domain resource comprises one or more of a Reference Signal (RS) sequence, a cyclic shift or an Orthogonal Cover Code (OCC).

In one embodiment, the steps marked by the box F54 in FIG. 5 exist; The first signaling is used by the first node U2 to determine scheduling information for the second signal, the first signaling comprises a first field, and the first field in the first signaling comprises two sub-fields; A target sub-field of the two sub-fields in the first signaling indicates the first reference signal resource, and the other one of the two sub-fields other than the target sub-field in the first signaling indicates a second reference signal resource; the second reference signal resource is used by the first node U2 to determine a spatial relation of the second signal.

In one embodiment, the first signal and the second signal both carry a first bit block; the first bit block is one of a TB, a CBG or a CB.

In one embodiment, the first signal and the second signal are respectively two repetitions of transmission of the first bit block.

In one embodiment, the first signal and the second signal are orthogonal in time domain.

In one embodiment, the first signal is earlier than the second signal in time domain.

In one embodiment, the first signal is later than the second signal in time domain.

In one embodiment, the first signal and the second signal occupy the same frequency-domain resources.

In one embodiment, the first signal and the second signal correspond to a same HARQ process number.

In one embodiment, the first signal and the second signal adopt a same MCS.

In one embodiment, the second signal is transmitted on a PUSCH.

In one embodiment, the steps marked by the box F54 in FIG. 5 do not exist.

Embodiment 6

Embodiment 6 illustrates a schematic diagram of a first reference signal resource, a first reference signal resource set and S reference signal resource sets according to one embodiment of the present disclosure; as shown in FIG. 6. In Embodiment 6, the first reference signal resource belongs to the first reference signal resource set, the first reference signal resource set being one of the S reference signal resource sets.

In one embodiment, the first reference signal resource comprises a Sounding Reference Signal (SRS) resource.

In one embodiment, the first reference signal resource is an SRS resource.

In one embodiment, the first reference signal resource comprises an SRS resource set.

In one embodiment, the first reference signal resource is an SRS resource set.

In one embodiment, the first reference signal resource comprises a Channel State Information-Reference Signal (CSI-RS) resource.

In one embodiment, the first reference signal resource comprises a Synchronisation Signal/physical broadcast channel Block (SSB) resource.

In one embodiment, the reference signal resource comprises a reference signal port.

In one embodiment, the reference signal resource comprises an SRS port.

In one embodiment, the reference signal resource comprises an antenna port.

In one embodiment, modulation symbols comprised in the reference signal resource are known to the first node.

In one embodiment, the first reference signal resource has W1 reference signal ports, W1 being a positive integer greater than 1.

In one embodiment, W1 is equal to 2 or 4.

In one embodiment, the W1 reference signal ports are respectively W1 SRS ports.

In one embodiment, the W1 reference signal ports are respectively W1 antenna ports.

In one embodiment, the first signal is transmitted by the W1 reference signal ports.

In one embodiment, the first signal is transmitted by a same antenna port as the W1 reference signal ports.

In one embodiment, a transmission antenna port for the first signal comprises the W1 reference signal ports.

In one embodiment, a transmission antenna port for the first signal comprises antenna ports of the W1 reference signal ports.

In one embodiment, the first signaling indicates the first reference signal resource.

In one embodiment, the first signaling indicates an identifier of the first reference signal resource.

In one embodiment, an identifier of the first reference signal resource includes SRS-ResourceSetId.

In one embodiment, an identifier of the first reference signal resource includes SRS-ResourceId.

In one embodiment, an identifier of the first reference signal resource is SRS-ResourceId.

In one embodiment, an identifier of the first reference signal resource includes Sounding reference signal Resource Indicator (SRI).

In one embodiment, an identifier of the first reference signal resource is SRI.

In one embodiment, the first signaling indicates an SRI codepoint corresponding to the first reference signal resource.

In one embodiment, the first signaling indicates a first TCI state, the first TCI state indicating the first reference signal resource.

In one embodiment, the first signaling indicates a TCI codepoint corresponding to the first reference signal resource.

In one embodiment, the first signaling comprises a second field, and the second field in the first signaling indicates the first reference signal resource; the second field comprises at least one bit.

In one embodiment, the second field comprises partial or all information in an SRS resource indicator field.

In one embodiment, the second field comprises partial or all information in a Transmission configuration indication field.

In one embodiment, the specific definition of the SRS resource indicator field can be found in 3GPP TS38.212, section 7.3.1.

In one embodiment, the specific definition of the Transmission configuration indication field can be found in 3GPP TS38.212, section 7.3.1.

In one embodiment, a value of the second field in the first signaling is equal to an identifier of the first reference signal resource.

In one embodiment, a value of the second field in the first signaling is equal to an SRI codepoint corresponding to the first reference signal resource.

In one embodiment, a value of the second field in the first signaling is equal to a TCI codepoint corresponding to the first reference signal resource.

In one embodiment, the first reference signal resource is obtained through a look-up from a table of a value of the second field in the first signaling.

In one embodiment, a format of the first signaling is used to determine the first reference signal resource.

In one embodiment, Cyclic Redundancy Check (CRC) of the first signaling is scrambled by a first Radio Network Temporary Identifier (RNTI), the first RNTI being used to determine the first reference signal resource.

In one embodiment, a time-frequency resource occupied by the first signaling is used to determine the first reference signal resource.

In one embodiment, the first reference signal resource set only comprises the first reference signal resource.

In one embodiment, the first reference signal resource set comprises at least one reference signal resource other than the first reference signal resource.

In one embodiment, the first reference signal resource set comprises an SRS resource set.

In one embodiment, the first reference signal resource set is an SRS resource set.

In one embodiment, the first reference signal resource set comprises one SRS resource.

In one embodiment, the first reference signal resource set comprises multiple SRS resources.

In one embodiment, any reference signal resource in the first reference signal resource set is an SRS resource.

In one embodiment, the first reference signal resource set comprises partial SRS resources in an SRS resource set.

In one embodiment, a higher-layer parameter usage corresponding to an SRS resource set to which the first reference signal resource set belongs is set to "codebook".

In one embodiment, a higher-layer parameter usage corresponding to the first reference signal resource set is set to "codebook".

In one embodiment, an identifier of the first reference signal resource set includes SRS-ResourceSetId.

In one embodiment, an identifier of the first reference signal resource set is SRS-ResourceSetId.

In one embodiment, an identifier of the first reference signal resource set includes SRS-ResourceId.

In one embodiment, the first signaling indicates the first reference signal resource set.

In one embodiment, the first signaling indicates the first reference signal resource set and indicates the first reference signal resource from the first reference signal resource set.

In one embodiment, a first bit in the second field in the first signaling indicates the first reference signal resource set.

In one subembodiment, S is equal to 2; if the first bit is equal to 0, the first reference signal resource set is one of the S reference signal resource sets that corresponds to a smaller reference signal resource set identifier; if the first bit is equal to 1, the first reference signal resource set is one of the S reference signal resource sets that corresponds to a larger reference signal resource set identifier.

In one subembodiment, the first bit is a Most Significant Bit (MSB) in the second field.

In one subembodiment, the first bit is a Least Significant Bit (LSB) in the second field.

In one embodiment, S is equal to 2.

In one embodiment, S is greater than 2.

In one embodiment, there is a reference signal resource set among the S reference signal resource set that only comprises one reference signal resource.

In one embodiment, there is a reference signal resource set among the S reference signal resource set that only comprises multiple reference signal resources.

In one embodiment, any one of the S reference signal resource sets comprises an SRS resource set.

In one embodiment, any one of the S reference signal resource sets is an SRS resource set.

In one embodiment, any one of the S reference signal resource sets comprises one or more SRS resources.

In one embodiment, any one of the S reference signal resource sets is an SRS resource.

In one embodiment, there is a reference signal resource set among the S reference signal resource sets that comprises partial SRS resources in an SRS resource set.

In one embodiment, there are two reference signal resource sets among the S reference signal resource sets that respectively comprise different SRS resources in a same SRS resource set.

In one embodiment, any two reference signal resource sets among the S reference signal resource sets comprise none of common reference signal resources.

In one embodiment, there are two reference signal resources having equal numbers of reference signal ports that respectively belong to two different reference signal resource sets among the S reference signal resource sets.

In one embodiment, for any two different reference signal resource sets among the S reference signal resource sets, there are two reference signal resources having equal numbers of reference signal ports that respectively belong to the two different reference signal resource sets.

In one embodiment, a reference signal port of any reference signal resource in any one of the S reference signal resource sets is an SRS port.

In one embodiment, there is a reference signal resource set among the S reference signal resource sets that comprises two reference signal resources having unequal numbers of reference signal ports.

In one embodiment, any two reference signal resources in the S reference signal resource sets have equal numbers of reference signal ports.

In one embodiment, any two reference signal resource sets among the S reference signal resource sets have unequal identifiers.

In one embodiment, an identifier for any reference signal resource set among the S reference signal resource sets is an SRS-ResourceSetId.

In one embodiment, an identifier for any reference signal resource set among the S reference signal resource sets is an SRS-ResourceId.

In one embodiment, the S reference signal resource sets belong to a same serving cell.

In one embodiment, the S reference signal resource sets belong to a same Carrier.

In one embodiment, the S reference signal resource sets belong to a same BandWidth Part (BWP).

In one embodiment, a higher-layer parameter usage of any one of the S reference signal resource sets is set to "codebook".

In one embodiment, a higher-layer parameter usage of an SRS resource set to which any one of the S reference signal resource sets belongs is set to "codebook".

Embodiment 7

Embodiment 7 illustrates a schematic diagram of a second power according to one embodiment of the present disclosure; as shown in FIG. 7. In Embodiment 7, the second power is equal to a minimum value of a first reference power and a first power threshold.

In one embodiment, the first power is measured in dBm.

In one embodiment, the second power is measured in dBm.

In one embodiment, the first power is measured in mW.

In one embodiment, the second power is measured in mW.

In one embodiment, a linear value of the first power is equal to 10 to the x1-th power, where the x1 equals the first power being divided by 10; a linear value of the second power is equal to 10 to the x2-th power, where the x2 equals the second power being divided by 10.

In one embodiment, the second power is $P_{PUSCH,b,f,c}(i, jq_d,1)$; the first signal is transmitted in a PUSCH transmission occasion i for an active uplink BWP-b of a carrier f for a serving cell c, an index of a parameter set configuration employed by the first signal is equal to j, and a PUSCH power-control state index for the first signal is equal to 1.

In one embodiment, the first reference power is measured in dBm.

In one embodiment, the first power threshold is measured in dBm.

In one embodiment, the first power threshold is $P_{CMAX,f,c}(i)$, where the $P_{CMAX,f,c}(i)$ is a maximum output power of a PUSCH transmission occasion i on a carrier f for a serving cell c, and the first signal is transmitted in the PUSCH transmission occasion i on the carrier f for the serving cell c.

In one embodiment, the first reference power is linearly correlated with a sum of R first-type offsets, R being a positive integer; a linear coefficient between the first reference power and the R first-type offsets is 1.

In one subembodiment, any of the R first-type offsets is indicated by Transmitter Power Control (TPC).

In one subembodiment, the sum of the R first-type offsets is $f_{b,f,c}(i,l)$.

In one subembodiment, R signalings respectively indicate the R first-type offsets, with the first signaling being a latest one among the R signalings; any of the R signalings comprises DCI.

In one embodiment, the first reference power is linear with a first component, and a linear coefficient between the first reference power and the first component is 1.

In one subembodiment, the first component is a PUSCH power reference.

In one subembodiment, the first component is $P_{O\_PUSCH,b,f,c}(i)$ where the $P_{O\_PUSCH,b,f,c}(i)$ is a PUSCH power reference for a parameter set configuration indexed by j used in an active uplink BWP-b of a carrier f for a serving cell c.

In one embodiment, the first reference power is linear with a second component, the second component is related to a bandwidth allocated to the first signal, and a linear coefficient between the first reference power and the second component is 1.

In one subembodiment, the second component is $10\log_{10}(2^\mu M_{R,B,b,f,c}^{PUSCH}(i))$; the $M_{R,B,b,f,c}^{PUSCH}(i)$ is a bandwidth measured in Resource Blocks allocated to a PUSCH corresponding to a subcarrier spacing configuration μ in a PUSCH transmission occasion i in an active uplink BWP-b of a carrier f for a serving cell c, where the subcarrier spacing configuration corresponding to the first signal is μ.

In one embodiment, the first reference power is linear with a first pathloss, and a linear coefficient between the first reference power and the first pathloss is a non-negative real number less than or equal to 1.

In one subembodiment, the first pathloss is $PL_{b,f,c}(q_d)$, and the $PL_{b,f,c}(q_d)$ is obtained by the first node through a reference signal indexed by $q_d$ in an active downlink BWP-b of a carrier f for a serving cell c.

In one subembodiment, the first pathloss is measured in dB.

In one subembodiment, a linear coefficient between the first reference power and the first pathloss is $a_{b,f,c}(j)$.

In one embodiment, the first reference power is linear with a third component, the third component being related to an MCS employed by the first signal, and a linear coefficient between the first reference power and the third component is 1.

In one subembodiment, the third component is $\Delta_{TF,b,f,c}(i)$.

In one embodiment, the first reference power is respectively linear with the first component, the second component, the third component, a sum of the R first-type offsets as well as the first pathloss, with linear coefficients between the first reference power and, respectively, the first component, the second component, the third component and the sum of the R first-type offsets being equal to 1, while the linear coefficient between the first reference power and the first pathloss is a non-negative real number no greater than 1.

Embodiment 8

Embodiment 8 illustrates a schematic diagram of a first node receiving a second information block and transmitting a first information block according to one embodiment of the present disclosure; as shown in FIG. 8. In Embodiment 8, as a response to the behavior of receiving the second information block, the first node transmits the first information block.

In one embodiment, the first information block is carried by a higher-layer message.

In one embodiment, the first information block is carried by an RRC message.

In one embodiment, the first information block is carried by an RRC signaling.

In one embodiment, the first information block is carried by a MAC CE signaling.

In one embodiment, the first information block comprises UE capability information.

In one embodiment, the first information block is carried by a UE capability IE.

In one embodiment, the first information block comprises information in all or partial fields in a UE capability IE.

In one embodiment, the first information block comprises information in one or more UE capability IEs.

In one embodiment, the first information block comprises information in all or partial fields in a first IE.

In one embodiment, a name of the first IE includes "FeatureSetUplink".

In one embodiment, the first information block comprises information in a fourth field in the first IE.

In one embodiment, the first information block is carried by a fourth field in the first IE.

In one embodiment, a name of the fourth field includes "FullPwrMode2".

In one embodiment, a name of the fourth field includes "TPMIGroup".

In one embodiment, a name of the fourth field includes "ul-FullPwrMode2-TPMIGroup".

In one embodiment, the first information block is carried by a UECapabilityInformation message.

In one embodiment, the first information block comprises a UECapabilityInformation message.

In one embodiment, the first information block is a UECapabilityInformation message.

In one embodiment, the first information block comprises an IE UECapabilityInformation message.

In one embodiment, the second information block is carried by a higher layer signaling.

In one embodiment, the second information block is carried by a higher layer message.

In one embodiment, the second information block is carried by an RRC signaling.

In one embodiment, the second information block is carried by an RRC message.

In one embodiment, the second information block is carried by a UECapabilityEnquiry message.

In one embodiment, the second information block is carried by a MAC CE signaling.

In one embodiment, the second information block comprises a UECapabilityEnquiry.

In one embodiment, the second information block comprises a UECapabilityEnquiry message.

In one embodiment, the second information block is a UECapabilityEnquiry message.

Embodiment 9

Embodiment 9 illustrates a schematic diagram of a first information block according to one embodiment of the present disclosure; as shown in FIG. 9. In Embodiment 9, the first information block carries S parameter groups, the S parameter groups respectively indicating the S matrix sets; any of the S matrix sets comprises at least one of a first-type matrix subset, a second-type matrix subset or a third-type matrix subset; for any given matrix set of the S matrix sets, a given parameter group of the S parameter groups indicates the given matrix set; if the given matrix set comprises a first-type matrix subset, the given parameter group comprises a first-type parameter; if the given matrix set comprises a second-type matrix subset, the given parameter group comprises a second-type parameter; if the given matrix set comprises a third-type matrix subset, the given parameter group comprises a third-type parameter; among the S matrix sets, there are only S1 matrix sets comprising first-type matrix subsets, there are only S2 matrix sets comprising second-type matrix subsets, and there are only S3 matrix sets comprising third-type matrix subsets, where S1, S2 and S3 are all non-negative integers no greater than the S.

In FIG. 9, indexes for the S parameter groups are respectively #0 . . . , and #(S−1).

In one embodiment, names of the first-type parameter include "twoPorts".

In one embodiment, names of the second-type parameter include "fourPortsNonCoherent".

In one embodiment, names of the third-column parameter include "fourPortsPartialCoherent".

In one embodiment, if the given matrix set does not comprise a first-type matrix subset, the given parameter group does not comprise a first-type parameter; if the given matrix set does not comprise a second-type matrix subset, the given parameter group does not comprise a second-type parameter; if the given matrix set does not comprise a third-type matrix subset, the given parameter group does not comprise a third-type parameter.

In one embodiment, the first node autonomously determines the S matrix sets.

In one embodiment, the S matrix sets are used by the first node for generating the first information block.

In one embodiment, S1 is equal to 0.
In one embodiment, S1 is greater than 0.
In one embodiment, S1 is equal to the S.
In one embodiment, S1 is less than the S.
In one embodiment, S2 is equal to 0.
In one embodiment, S2 is greater than 0.
In one embodiment, S2 is equal to the S.
In one embodiment, S2 is less than the S.
In one embodiment, S3 is equal to 0.
In one embodiment, S3 is greater than 0.
In one embodiment, S3 is equal to the S.
In one embodiment, S3 is less than the S.
In one embodiment, the S1, the S2 and the S3 are all equal to the S.

In one embodiment, the S1 is equal to the S, while the S2 and the S3 are both equal to 0.

In one embodiment, the S1 is equal to 0, while the S2 and the S3 are equal to the S.

In one embodiment, the S1 and the S3 are both equal to 0, while the S2 is equal to the S.

In one embodiment, the S1 and the S2 are both equal to the S, while the S3 is equal to 0.

In one embodiment, the first matrix set only comprises one first-type matrix subset.

In one embodiment, the first matrix set only comprises one second-type matrix subset.

In one embodiment, the first matrix set only comprises one third-type matrix subset.

In one embodiment, the first matrix set only comprises one second-type matrix subset and one third-type matrix subset.

In one embodiment, the first matrix set only comprises one first-type matrix subset and one second-type matrix subset.

In one embodiment, the first matrix set comprises one first-type matrix subset, one second-type matrix subset and one third-type matrix subset.

In one embodiment, the S1 matrix sets respectively comprise S1 first-type matrix subsets, any of the S1 first-type matrix subsets comprising at least one matrix; a number of rows and a number of column(s) in any matrix in any one of the S1 first-type matrix subsets are respectively equal to 2 and 1, and a number of non-zero element(s) comprised in a column of any matrix in any one of the S1 first-type matrix subsets is equal to 1.

In one embodiment, there is one first-type matrix subset among the S1 first-type matrix subsets comprising only one matrix.

In one embodiment, there is one first-type matrix subset among the S1 first-type matrix subsets comprising multiple matrices.

In one embodiment, there is one first-type matrix subset among the S1 first-type matrix subsets comprising 2 matrices.

In one embodiment, any matrix in any of the S1 first-type matrix subsets is one of G3 candidate matrices, G3 being a positive integer greater than 1.

In one embodiment, the G3 candidate matrices are pre-defined.

In one embodiment, the G3 candidate matrices are default.

In one embodiment, G3 is equal to 2, the G3 candidate matrices respectively being $$\frac{1}{\sqrt{2}}\begin{bmatrix}1\\0\end{bmatrix} \text{ and } \frac{1}{\sqrt{2}}\begin{bmatrix}0\\1\end{bmatrix}.$$

In one embodiment, S1 parameter groups of the S parameter groups respectively indicate the S1 matrix sets; the S1 parameter groups respectively comprise S1 first-type parameters; the S1 first-type parameters respectively comprise S1 bit strings; the S1 bit strings respectively indicate which candidate matrices of the G3 candidate matrices are comprised by the S1 first-type matrix subsets.

In one subembodiment, G3 is equal to 2, any of the S1 bit strings comprises 2 bits; for any given bit string of the S1 bit strings, if a first-type matrix subset corresponding to the given bit string comprises a first candidate matrix of the G3 candidate matrices, a first bit in the given bit string is equal to 1, otherwise, the first bit in the given bit string is equal to 0; if the first-type matrix subset corresponding to the given bit string comprises a second candidate matrix of the G3 candidate matrices, a second bit in the given bit string is equal to 1, otherwise, the second bit in the given bit string is equal to 0.

In one embodiment, the S2 matrix sets respectively comprise S2 second-type matrix subsets, any of the S2 second-type matrix subsets comprising at least one matrix; a number of rows in any matrix in any one of the S2 second-type matrix subsets is equal to 4, and any matrix in any one of the S2 second-type matrix subsets comprises at least one column; a number of non-zero element(s) comprised in any column in any matrix in any one of the S2 second-type matrix subsets is equal to 1.

In one embodiment, there is a second-type matrix subset among the S2 second-type matrix subsets that only comprises one matrix.

In one embodiment, there is a second-type matrix subset among the S2 second-type matrix subsets that comprises multiple matrices.

In one embodiment, any matrix in any one of the S2 second-type matrix subsets has at least one row in which each element is zero.

In one embodiment, any second-type matrix subset among the S2 second-type matrix subsets is one of G2 candidate matrix subsets, G2 being a positive integer greater than 1.

In one embodiment, the G2 candidate matrix subsets are pre-defined.

In one embodiment, G2 is equal to 4.

In one embodiment, S2 parameter groups of the S parameter groups respectively indicate the S2 matrix sets; the S2 parameter groups respectively comprise S2 second-type parameters; the S2 second-type parameters respectively indicate the S2 second-type matrix subsets.

In one subembodiment, the S2 second-type parameters respectively indicate the S2 second-type matrix subsets by means of enumerating.

In one subembodiment, the S2 second-type parameters respectively indicate the S2 second-type matrix subsets from the G2 candidate matrix subsets.

In one embodiment, the S3 matrix sets respectively comprise S3 third-type matrix subsets, any of the S3 third-type matrix subsets comprising at least one matrix; the number of rows in any matrix in any one of the S3 third-type matrix subsets is equal to 4, and any matrix in any one of the S3 third-type matrix subsets comprises at least one column; a number of non-zero elements comprised in any column in any matrix in any one of the S3 third-type matrix subsets is less than 4.

In one embodiment, there is a third-type matrix subset among the S3 third-type matrix subsets that only comprises one matrix.

In one embodiment, there is a third-type matrix subset among the S3 third-type matrix subsets that comprises multiple matrixes.

In one embodiment, any matrix in any one of the S3 third-type matrix subsets has at least one row in which each element is zero.

In one embodiment, a number of non-zero element(s) comprised in any column of any matrix in any one of the S3 third-type matrix subsets is equal to 1 or 2.

In one embodiment, there is a third-type matrix subset among the S3 third-type matrix subsets that comprises a matrix having one column in which the number of non-zero elements comprised is equal to 2.

In one embodiment, any third-type matrix subset among the S3 third-type matrix subsets comprises a matrix having one column in which the number of non-zero elements comprised is equal to 2.

In one embodiment, any of the S3 third-type matrix subsets is one of G1 candidate matrix subsets, G1 being a positive integer greater than 1.

In one embodiment, the G1 candidate matrix subsets are pre-defined.

In one embodiment, G1 is equal to 7.

In one embodiment, G2 is less than G1, any candidate matrix subset of the G2 candidate matrix subsets is one of the G1 candidate matrix subsets.

In one embodiment, S3 parameter groups of the S parameter groups respectively indicate the S3 matrix sets; the S3 parameter groups respectively comprise S3 third-type parameters; the S3 third-type parameters respectively indicate the S3 third-type matrix subsets.

In one subembodiment, the S3 third-type parameters indicate the S3 third-type matrix subsets respectively by means of enumerating.

In one subembodiment, the S3 third-type parameters indicate the S3 third-type matrix subsets respectively from the G1 candidate matrix subsets.

$$\left\{\frac{1}{2}\begin{bmatrix}1\\0\\0\\0\end{bmatrix}\right\}, \left\{\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}\right\},$$

$$\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}, \frac{1}{2}\begin{bmatrix}1&0&0\\0&1&0\\0&0&1\\0&0&0\end{bmatrix}\right\}$$

-continued $$\left\{\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix},\frac{1}{2}\begin{bmatrix}1&0\\0&1\\0&0&1\\0&0\end{bmatrix}\right\},$$

$$\left\{\begin{bmatrix}1\\1\\0\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix},\frac{1}{2}\begin{bmatrix}1&0\\0&0\\0&1\\0&0\end{bmatrix}\right\},$$

$$\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix},\frac{1}{2}\begin{bmatrix}1&0\\0&0\\0&1\\0&0\end{bmatrix},\right.$$
$$\left.\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix},\frac{1}{2}\begin{bmatrix}1&0\\0&1\\0&0&1\\0&0\end{bmatrix}\right\},\text{ and}$$

$$\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix},\frac{1}{2}\begin{bmatrix}0\\1\\0\\1\end{bmatrix},\frac{1}{2}\begin{bmatrix}0\\1\\0\\-1\end{bmatrix},\right.$$
$$\frac{1}{2}\begin{bmatrix}0\\1\\0\\j\end{bmatrix},\frac{1}{2}\begin{bmatrix}0\\1\\0\\-j\end{bmatrix},\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},$$
$$\left.\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\0&0\\1&0\\0&1\end{bmatrix},\frac{1}{2}\begin{bmatrix}1&0\\0&1\\0&0&1\\0&0\end{bmatrix}\right\}$$

In one embodiment, G1 is equal to 7, the G1 candidate matrix subsets respectively being.

In one embodiment, G2 is equal to 4, the G2 candidate matrix subsets respectively being the first four candidate matrix subsets among the G3 candidate matrix subsets.

Embodiment 10

Embodiment 10 illustrates a schematic diagram of a target sub-field's position in two sub-fields used to determine a first matrix set according to one embodiment of the present disclosure; as shown in FIG. 10. In Embodiment 10, the target sub-field is one of the two sub-fields in the first signaling; if the target sub-field is a first sub-field of the two sub-fields, the first reference signal resource set is a first target reference signal resource set among the S reference signal resource sets, and the first matrix set is one of the S matrix sets that corresponds to the first target reference signal resource set; if the target sub-field is a second sub-field of the two sub-fields, the first reference signal resource set is a second target reference signal resource set among the S reference signal resource sets, and the first matrix set is one of the S matrix sets that corresponds to the second target reference signal resource set.

In one embodiment, the position of the target sub-field in the two sub-fields is used by the first node to determine the first matrix set.

In one embodiment, of the two sub-fields in the first signaling only the target sub-field indicates the first reference signal resource.

In one embodiment, of the two sub-fields in the first signaling a sub-field other than the target sub-field indicates a second reference signal resource.

In one embodiment, the second reference signal resource comprises one SRS resource.

In one embodiment, an SRS-ResourceId for the second reference signal resource is unequal to that for the first reference signal resource.

In one embodiment, the second reference signal resource and the first reference signal resource are not QCL.

In one embodiment, the two sub-fields comprise equal numbers of bits.

In one embodiment, the two sub-fields comprise unequal numbers of bits.

In one embodiment, the target sub-field indicates a TCI codepoint corresponding to the first reference signal resource.

In one embodiment, the target sub-field indicates an SRI for the first reference signal resource.

In one embodiment, the target sub-field indicates an SRI codepoint corresponding to the first reference signal resource.

In one embodiment, the target sub-field indicates an identifier for the first reference signal resource.

In one embodiment, the position of the target sub-field in the two sub-fields refers to whether the target sub-field is a first or a second one of the two sub-fields.

In one embodiment, the position of the target sub-field in the two sub-fields is used to determine the first reference signal resource set.

In one embodiment, the position of the target sub-field in the two sub-fields is used to determine the first reference signal resource set out of the S reference signal resource sets.

In one embodiment, the phrase that a position of the target sub-field in the two sub-fields is used to determine the first matrix set has a meaning that the position of the target sub-field in the two sub-fields is used to determine the first reference signal resource set out of the S reference signal resource sets, and that the first matrix set is one of the S matrix sets corresponding to the first reference signal resource set.

In one embodiment, the phrase that a position of the target sub-field in the two sub-fields is used to determine the first matrix set has a meaning that the position of the target sub-field in the two sub-fields is used to determine which one of the S matrix sets is the first matrix set.

In one embodiment, the first target reference signal resource set and the second target reference signal resource set are respectively indicated by higher-layer signalings from the S reference signal resource sets.

In one embodiment, positions of the first target reference signal resource set and the second target reference signal resource set among the S reference signal resource sets are default.

In one embodiment, the first target reference signal resource set is a reference signal resource set corresponding to a minimum reference signal resource set identifier among the S reference signal resource sets, while the second target reference signal resource set is a reference signal resource set corresponding to a maximum reference signal resource set identifier among the S reference signal resource sets.

In one embodiment, the first target reference signal resource set is a reference signal resource set corresponding to a minimum reference signal resource set identifier among the S reference signal resource sets, while the second target reference signal resource set is a reference signal resource set corresponding to a second-smallest reference signal resource set identifier among the S reference signal resource sets.

In one embodiment, S is equal to 2, which one of the S reference signal resource sets is the first target reference signal resource set is configurable, and the second target reference signal resource set is the other one of the S reference signal resource sets different from the first target reference signal resource set.

In one subembodiment, which one of the S reference signal resource sets is the first target reference signal resource set is configured by RRC signaling.

In one subembodiment, which one of the S reference signal resource sets is the first target reference signal resource set is configured by MAC CE signaling.

In one subembodiment, which one of the S reference signal resource sets is the first target reference signal resource set is configured by dynamic signaling.

Embodiment 11

Figure 11:
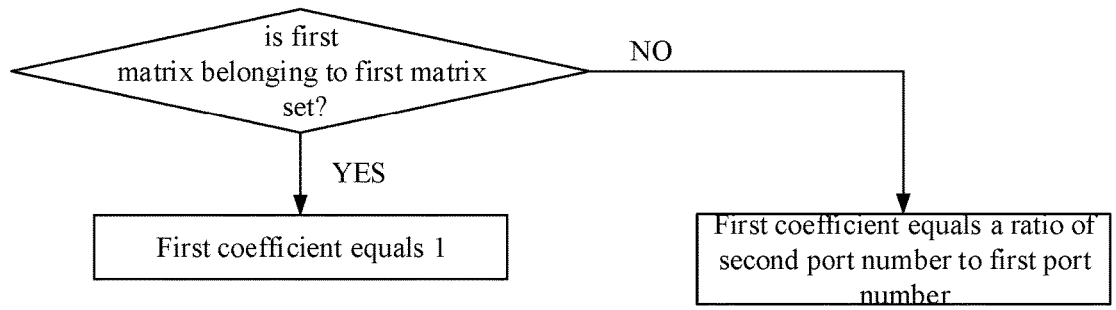
FIG. 11 illustrates a schematic diagram of whether a first matrix belongs to a first matrix set being used to determine a first coefficient according to one embodiment of the present disclosure.

FIG. 11 illustrates a schematic diagram of whether a first matrix belongs to a first matrix set being used to determine a first coefficient according to one embodiment of the present disclosure; as shown in FIG. 11. In Embodiment 11, when the first matrix belongs to the first matrix set, the first coefficient is equal to 1; when the first matrix does not belong to the first matrix set, the first coefficient is equal to a ratio of the second port number to the first port number.

In one embodiment, if the first matrix belongs to the first matrix set, the first coefficient is equal to 1; if the first matrix does not belong to the first matrix set, the first coefficient is equal to a ratio of the second port number to the first port number.

In one embodiment, the first port number is equal to a number of reference signal ports for the first reference signal resource.

In one embodiment, the first port number is equal to a number of reference signal ports configured for the first reference signal resource.

In one embodiment, the first port number is equal to a number of reference signal ports for the first reference signal resource.

In one embodiment, the first port number is equal to a maximum value among numbers of reference signal ports for all reference signal resources in the first reference signal resource set.

In one embodiment, the first port number is equal to a maximum value among numbers of reference signal ports for all reference signal resources in the S reference signal resource sets.

In one embodiment, the first port number is equal to a number of rows in the first matrix.

In one embodiment, the second port number is equal to a number of rows comprised in the first matrix which are not all-zero.

In one embodiment, the ratio of the second port number to the first port number is equal to the second port number being divided by the first port number.

Embodiment 12

Figure 12:
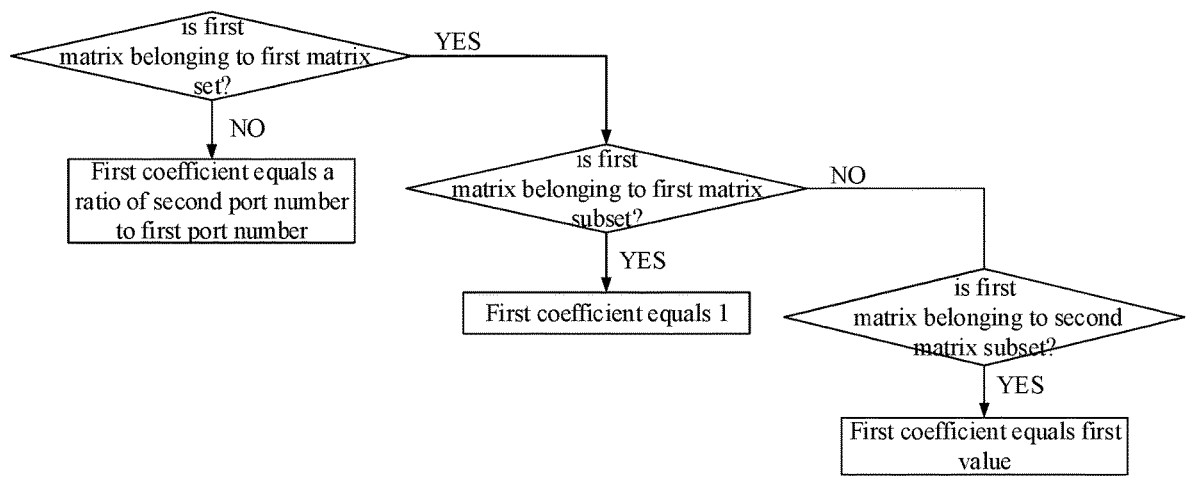
FIG. 12 illustrates a schematic diagram of whether a first matrix belongs to a first matrix set being used to determine a first coefficient according to one embodiment of the present disclosure.

FIG. 12 illustrates a schematic diagram of whether a first matrix belongs to a first matrix set being used to determine a first coefficient according to one embodiment of the present disclosure; as shown in FIG. 12. In Embodiment 12, the first matrix set comprises a first matrix subset and a second matrix subset; when the first matrix does not belong to the first matrix set, the first coefficient is equal to a ratio of a second port number to a first port number, where the second port number and the first port number are respectively positive integers, the second port number is equal to a number of non-zero power transmission antenna ports for a PUSCH bearing the first signal, while the first port number is associated with the first reference signal resource; when the first matrix belongs to the first matrix subset, the first coefficient is equal to 1; when the first matrix belongs to the second matrix subset, the first coefficient is equal to a first value, the first value being a positive real number greater than the ratio of the second port number to the first port number and less than 1.

In one embodiment, the first value is pre-configured.

In one embodiment, the first value is configured by an RRC signaling.

In one embodiment, the first value is default.

In one embodiment, the first information block indicates the first value.

Embodiment 13

Figure 13:
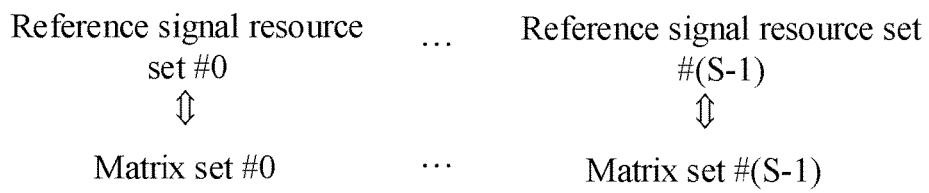
FIG. 13 illustrates a schematic diagram of correspondence relations between S matrix sets and S reference signal resource sets according to one embodiment of the present disclosure.

Embodiment 13 illustrates a schematic diagram of correspondence relations between S matrix sets and S reference signal resource sets according to one embodiment of the present disclosure; as shown in FIG. 13. In Embodiment 13, the first information block comprises S information sub-blocks, the S information sub-blocks being sequentially arranged in the first information block; the S information sub-blocks respectively indicate the S matrix sets; a first information sub-block among the S information sub-blocks indicates the first matrix set; the S reference signal resource sets are sequentially arranged; a position of the first information sub-block in the S information sub-blocks is the same as a position of the first reference signal resource set in the S reference signal resource sets.

In one embodiment, the S information sub-blocks respectively comprise partial information in the fourth field in the first IE.

In one embodiment, the S information sub-blocks respectively comprise information in S different fields in the first IE.

In one embodiment, the S information sub-blocks respectively indicate the S parameter groups.

In one embodiment, the position of the first information sub-block among the S information sub-blocks is used to determine which one of the S reference signal resource sets corresponds to the first matrix set.

In one embodiment, the position of the first information sub-block among the S information sub-blocks is used to determine that the first reference signal resource set among the S reference signal resource sets corresponds to the first matrix set.

In one embodiment, the S information sub-blocks are chronologically arranged in sequence according to respective occurrences in the first information block.

In one embodiment, the S reference signal resource sets are arranged sequentially according to an ascending order of respectively corresponding reference signal resource set identifiers.

In one embodiment, the S reference signal resource sets are arranged sequentially according to a descending order of respectively corresponding reference signal resource set identifiers.

In one embodiment, the S reference signal resource sets are arranged sequentially according to numbers of reference signal resources respectively comprised within.

In one embodiment, the S reference signal resource sets are arranged sequentially according to spatial relations of reference signal resources respectively comprised within.

In one embodiment, the phrase that the S reference signal resource sets are arranged sequentially means that: for any two reference signal resource sets among the S reference signal resource sets, if an identifier for any one of the two reference signal resource sets is smaller than that for the other one of the two reference signal resource sets, the said reference signal resource set ranks before the other said reference signal resource set in the S reference signal resource sets.

In one embodiment, the phrase that the S reference signal resource sets are arranged sequentially means that: for any two reference signal resource sets among the S reference signal resource sets, if an identifier for any one of the two reference signal resource sets is greater than that for the other one of the two reference signal resource sets, the said reference signal resource set ranks before the other said reference signal resource set in the S reference signal resource sets.

In one embodiment, S is equal to 2; the first information block is comprised of 2 information sub-blocks, the 2 information sub-blocks being sequentially arranged in the first information block; the 2 information sub-blocks respectively indicate the S matrix sets; a target information sub-block of the 2 information sub-blocks indicates the first matrix set.

In one subembodiment, if the first reference signal resource set is a reference signal resource set corresponding to a smaller reference signal resource set identifier among the S reference signal resource sets, the target information sub-block is a first information sub-block of the 2 information sub-blocks; if the first reference signal resource set is a reference signal resource set corresponding to a larger reference signal resource set identifier among the S reference signal resource sets, the target information sub-block is a second information sub-block of the 2 information sub-blocks.

In one subembodiment, if the first reference signal resource set is a reference signal resource set corresponding to a larger reference signal resource set identifier among the S reference signal resource sets, the target information sub-block is a first information sub-block of the 2 information sub-blocks; if the first reference signal resource set is a reference signal resource set corresponding to a smaller reference signal resource set identifier among the S reference signal resource sets, the target information sub-block is a second information sub-block of the 2 information sub-blocks.

Embodiment 14

Figure 14:
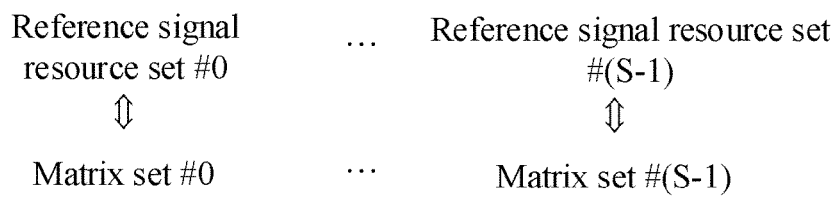
FIG. 14 illustrates a schematic diagram of correspondence relations between S matrix sets and S reference signal resource sets according to one embodiment of the present disclosure.

Embodiment 14 illustrates a schematic diagram of correspondence relations between S matrix sets and S reference signal resource sets according to one embodiment of the present disclosure; as shown in FIG. 14. In Embodiment 14, the first information block comprises at least one of a first-type information sub-block, a second-type information sub-block or a third-type information sub-block; the first-type information sub-block comprises S1 pieces of sub-information, the S1 pieces of sub-information respectively carrying the S1 first-type parameters, the S1 pieces of sub-information being sequentially arranged in the first-type information sub-block; the second-type information sub-block comprises S2 pieces of sub-information, the S2 pieces of sub-information respectively carrying the S2 second-type parameters, the S2 pieces of sub-information being sequentially arranged in the second-type information sub-block; the third-type information sub-block comprises S3 pieces of sub-information, the S3 pieces of sub-information respectively carrying the S3 third-type parameters, the S3 pieces of sub-information being sequentially arranged in the third-type information sub-block; the first matrix set comprises at least one of a third matrix subset, a fourth matrix subset or a fifth matrix subset, where the third matrix subset is one of the S1 first-type matrix subsets, the fourth matrix subset is one of the S2 second-type matrix subsets, and the fifth matrix subset is one of the S3 third-type matrix subsets; first target sub-information among the S1 pieces of sub-information indicates the third matrix subset, second target sub-information among the S2 pieces of sub-information indicates the fourth matrix subset, and third target sub-information among the S3 pieces of sub-information indicates the fifth matrix subset; the S reference signal resource sets are sequentially arranged; at least one of a position of the first target sub-information among the S1 pieces of sub-information, or a position of the second target sub-information among the S2 pieces of sub-information, or a position of the third target sub-information among the S3 pieces of sub-information is the same as that of the first reference signal resource set among the S reference signal resource sets.

In one embodiment, the first-type information sub-block carries all first-type parameters comprised in the S parameter groups, the second-type information sub-block carries all second-type parameters comprised in the S parameter groups, and the third-type information sub-block carries all third-type parameters comprised in the S parameter groups.

In one embodiment, the first information block comprises merely the first-type information sub-block among the first-type information sub-block, the second-type information sub-block and the third-type information sub-block.

In one embodiment, the first information block comprises merely the first-type information sub-block and the second-type information sub-block among the first-type information sub-block, the second-type information sub-block and the third-type information sub-block.

In one embodiment, the first information block comprises merely the second-type information sub-block and the third-type information sub-block among the first-type information sub-block, the second-type information sub-block and the third-type information sub-block.

In one embodiment, the first information block comprises merely the second-type information sub-block among the first-type information sub-block, the second-type information sub-block and the third-type information sub-block.

In one embodiment, the first information block comprises the first-type information sub-block, the second-type information sub-block and the third-type information sub-block.

In one embodiment, the S1, the S2 and the S3 are all equal to the S, the first matrix set comprises the third matrix subset, the fourth matrix subset and the fifth matrix subset; a position of the first target sub-information in the S1 pieces of sub-information is the same as a position of the second target sub-information in the S2 pieces of sub-information, and a position of the first target sub-information in the S1 pieces of sub-information is the same as a position of the third target sub-information in the S3 pieces of sub-information; a position of the first target sub-information in the S1 pieces of sub-information is the same as a position of the first reference signal resource set in the S reference signal resource sets.

In one embodiment, the S2 and the S3 are both equal to 0, while the S1 is equal to the S, the first matrix set comprises the third matrix subset; a position of the first target sub-information in the S1 pieces of sub-information is the same as a position of the first reference signal resource set in the S reference signal resource sets.

In one embodiment, the S1 is equal to 0, while the S2 and the S3 are both equal to the S; the first matrix set comprises the fourth matrix subset and the fifth matrix subset; a position of the second target sub-information in the S2 pieces of sub-information is the same as a position of the third target sub-information in the S3 pieces of sub-information; a position of the second target sub-information in the S2 pieces of sub-information is the same as a position of the first reference signal resource set in the S reference signal resource sets.

In one embodiment, the S3 is equal to 0, while the S1 and the S2 are both equal to the S; the first matrix set comprises the third matrix subset and the fourth matrix subset; a position of the first target sub-information in the S1 pieces of sub-information is the same as a position of the second target sub-information in the S2 pieces of sub-information; a position of the first target sub-information in the S1 pieces of sub-information is the same as a position of the first reference signal resource set in the S reference signal resource sets.

In one embodiment, the S1 and S3 are both equal to 0, while the S2 is equal to the S; the first matrix set comprises the fourth matrix subset; a position of the second target sub-information in the S2 pieces of sub-information is the same as a position of the first reference signal resource set in the S reference signal resource sets.

In one embodiment, a first-type parameter carried by the first target sub-information indicates the third matrix subset, a second-type parameter carried by the second target sub-information indicates the fourth matrix subset, and a third-type parameter carried by the third target sub-information indicates the fifth matrix subset.

In one embodiment, a position of the first target sub-information in the S1 pieces of sub-information is used to determine which one of the S reference signal resource sets corresponds to the first matrix set.

In one embodiment, a position of the second target sub-information in the S2 pieces of sub-information is used to determine which one of the S reference signal resource sets corresponds to the first matrix set.

In one embodiment, a position of the third target sub-information in the S3 pieces of sub-information is used to determine which one of the S reference signal resource sets corresponds to the first matrix set.

In one embodiment, a position of the first target sub-information in the S1 pieces of sub-information is used to determine that the first reference signal resource set among the S reference signal resource sets corresponds to the first matrix set.

In one embodiment, a position of the second target sub-information in the S2 pieces of sub-information is used to determine that the first reference signal resource set among the S reference signal resource sets corresponds to the first matrix set.

In one embodiment, a position of the third target sub-information in the S3 pieces of sub-information is used to determine that the first reference signal resource set among the S reference signal resource sets corresponds to the first matrix set.

In one embodiment, the first reference signal resource set is an x-th reference signal resource set among the S reference signal resource sets; where x is a positive integer no greater than S.

In one subembodiment, the first target sub-information is an x-th one of the S1 pieces of sub-information, S1 being equal to the S.

In one subembodiment, the second target sub-information is an x-th one of the S2 pieces of sub-information, S2 being equal to the S.

In one subembodiment, the third target sub-information is an x-th one of the S3 pieces of sub-information, S3 being equal to the S.

In one embodiment, the S reference signal resource sets are arranged sequentially according to an ascending order of respectively corresponding reference signal resource set identifiers.

Embodiment 15

Figure 15:
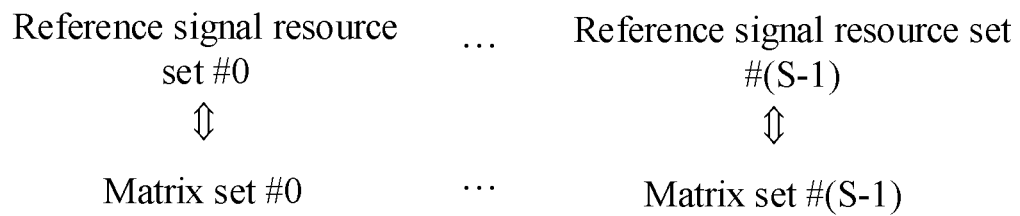
FIG. 15 illustrates a schematic diagram of correspondence relations between S matrix sets and S reference signal resource sets according to one embodiment of the present disclosure.

Embodiment 15 illustrates a schematic diagram of correspondence relations between S matrix sets and S reference signal resource sets according to one embodiment of the present disclosure; as shown in FIG. 15. In Embodiment 15, S information blocks are respectively used to indicate configuration information for the S reference signal resource sets; for any given information block among the S information blocks, the given information block indicates configuration information for a given reference signal set among the S reference signal resource sets; the given information block indicates a matrix set corresponding to the given reference signal set among the S matrix sets.

In one embodiment, the S information blocks are respectively borne by an RRC signaling.

In one embodiment, the S information blocks respectively comprise different pieces of information in a same field in a same IE.

In one embodiment, the S information blocks respectively comprise different pieces of information in a srs-Resource-SetToAddModList field in a SRS-Config IE.

In one embodiment, configuration information for a reference signal resource set comprises at least one of a reference signal resource identifier, a time-domain behavior, an associated CSI-RS, an associated SSB or a higher-layer parameter usage.

Embodiment 16

Figure 16:
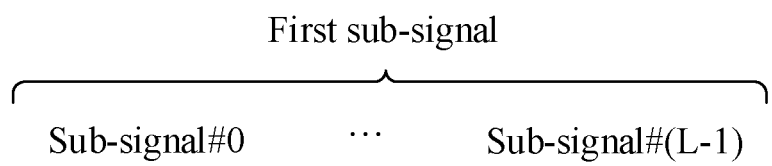
FIG. 16 illustrates a schematic diagram of a first signal comprising L sub-signals according to one embodiment of the present disclosure.

FIG. 16 illustrates a schematic diagram of a first signal comprising L sub-signals according to one embodiment of the present disclosure; as shown in FIG. 16. In Embodiment 16, the first signal comprises L sub-signals, where L is a positive integer greater than 1; the L sub-signals occupy same time-frequency resources; a linear value of a transmit power for a first sub-signal among the L sub-signals is equal to a product of a linear value of the first power and a second coefficient, the second coefficient being a positive real number greater than 1/L and less than 1.

In one embodiment, L is a positive integer no greater than 4.

In one embodiment, L is a number of layers of the first signal.

In one embodiment, the L sub-signals are respectively L layers of the first signal.

In one embodiment, the first signal is transmitted by a first antenna port group, with at least one transmission antenna port for the first sub-signal belonging to a first antenna port sub-group; the first antenna port group comprises more than one antenna port, and the first antenna port sub-group is a proper subset of the first antenna port group.

In one embodiment, a number of antenna ports comprised in the first antenna port group is equal to the first port number.

In one embodiment, a number of antenna ports comprised in the first antenna port group is equal to the second port number.

In one embodiment, a number of non-zero power antenna ports comprised in the first antenna port group is equal to the second port number.

In one embodiment, the first antenna port group is composed of antenna ports for a reference signal port of the first reference signal resource.

In one embodiment, the first antenna port group is composed of non-zero power antenna ports allocated to a PUSCH bearing the first signal among antenna ports for a reference signal port of the first reference signal resource.

In one embodiment, the first information block is used to determine the first antenna port sub-group.

In one embodiment, the first information block indicates the first antenna port sub-group from the first antenna port group.

In one embodiment, the first information block is used to determine the second coefficient.

In one embodiment, any antenna port in the first antenna port sub-group can transmit with full power.

In one embodiment, a number of antenna ports belonging to the first antenna port sub-group among transmission antenna ports for the first sub-signal is used to determine the second coefficient.

In one embodiment, when a number of antenna ports belonging to the first antenna port sub-group among transmission antenna ports for the first sub-signal is equal to M1, the second coefficient is equal to a second value; when a number of antenna ports belonging to the first antenna port sub-group among transmission antenna ports for the first sub-signal is equal to M2, the second coefficient is equal to a third value; M1 is smaller than M2, and the second value is no greater than the third value.

In one embodiment, a number of antenna ports belonging to the first antenna port sub-group among transmission antenna ports for the first sub-signal and a number of non-zero power transmission antenna ports for a PUSCH bearing the first signal are jointly used to determine the second coefficient.

In one embodiment, a ratio of a number of antenna ports belonging to the first antenna port sub-group among transmission antenna ports for the first sub-signal to a number of non-zero power transmission antenna ports for a PUSCH bearing the first signal is equal to a first ratio, the first ratio being used to determine the second coefficient.

In one subembodiment, when the first ratio is equal to a fourth value, the second coefficient is equal to a fifth value; when the first ratio is equal to a sixth value, the second coefficient is equal to a seventh value; the fourth value is smaller than the sixth value, and the fifth value is no greater than the seventh value.

Embodiment 17

Figure 17:
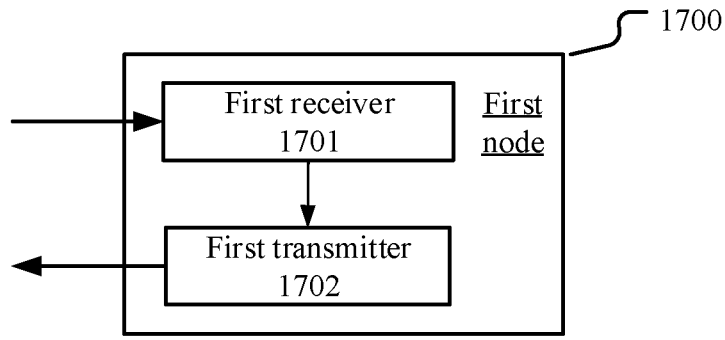
FIG. 17 illustrates a structure block diagram of a processing device in a first node according to one embodiment of the present disclosure.

FIG. 17 illustrates a structure block diagram of a processing device used in a first node according to one embodiment of the present disclosure; as shown in FIG. 17. In FIG. 17, a processing device 1700 in a first node is comprised of a first receiver 1701 and a first transmitter 1702.

In Embodiment 17, the first receiver 1701 receives a first signaling; and the first transmitter 1702 transmits a first signal.

In Embodiment 17, the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

In one embodiment, the first transmitter 1702 transmits a first information block; herein, the first information block indicates the S matrix sets.

In one embodiment, the first receiver 1701 receives a second information block; herein, as a response to the behavior of receiving the second information block, the first node transmits the first information block.

In one embodiment, the first signaling comprises a first field, and the first field in the first signaling comprises two sub-fields; a target sub-field of the two sub-fields in the first signaling indicates the first reference signal resource; a position of the target sub-field in the two sub-fields is used to determine the first matrix set, any of the two sub-fields comprising at least one bit.

In one embodiment, when the first matrix belongs to the first matrix set, the first coefficient is equal to 1; when the first matrix does not belong to the first matrix set, the first coefficient is equal to a ratio of a second port number to a first port number, the second port number and the first port number respectively being positive integers; the second port number is equal to a number of non-zero power transmission antenna ports of a PUSCH bearing the first signal, while the first port number is associated with the first reference signal resource.

In one embodiment, the first information block comprises S information sub-blocks, the S information sub-blocks being sequentially arranged in the first information block; the S information sub-blocks respectively indicate the S matrix sets; a first information sub-block among the S information sub-blocks indicates the first matrix set; the S reference signal resource sets are sequentially arranged; a position of the first information sub-block in the S information sub-blocks is the same as a position of the first reference signal resource set in the S reference signal resource sets.

In one embodiment, the first signal comprises L sub-signals, where L is a positive integer greater than 1; the L sub-signals occupy same time-frequency resources; there are two sub-signals among the L sub-signals that have different transmit powers.

In one embodiment, the first node is a UE.

In one embodiment, the first node is a relay node.

In one embodiment, the first receiver 1701 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1702 comprises at least one of the antenna 452, the transmitter 454, the transmitting processor 468, the multi-antenna transmitting processor 457, the controller/processor 459, the memory 460 or the data source 467 in Embodiment 4.

Embodiment 18

Figure 18:
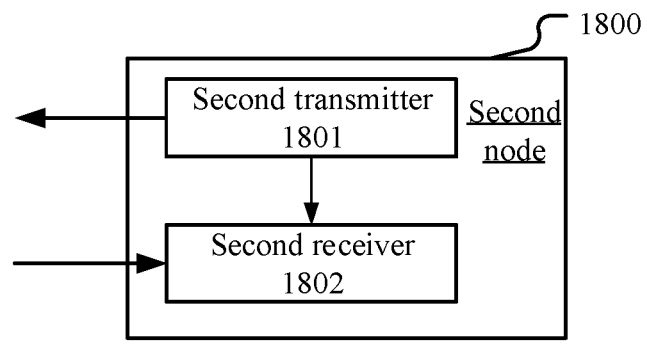
FIG. 18 illustrates a structure block diagram of a processing device used in a second node according to one embodiment of the present disclosure.

FIG. 18 illustrates a structure block diagram of a processing device used in a second node according to one embodiment of the present disclosure; as shown in FIG. 18. In FIG. 18, a processing device 1800 in a second node is comprised of a second transmitter 1801 and a second receiver 1802.

In Embodiment 18, the second transmitter 1801 transmits a first signaling; and the second receiver 1802 receives a first signal.

In Embodiment 18, the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

In one embodiment, the second receiver 1802 receives a first information block; herein, the first information block indicates the S matrix sets.

In one embodiment, the second transmitter 1801 transmits a second information block; herein, as a response to the behavior of receiving the second information block, a transmitter for the first signal transmits the first information block.

In one embodiment, the first signaling comprises a first field, and the first field in the first signaling comprises two sub-fields; a target sub-field of the two sub-fields in the first signaling indicates the first reference signal resource; a position of the target sub-field in the two sub-fields is used to determine the first matrix set, any of the two sub-fields comprising at least one bit.

In one embodiment, when the first matrix belongs to the first matrix set, the first coefficient is equal to 1; when the first matrix does not belong to the first matrix set, the first coefficient is equal to a ratio of a second port number to a first port number, the second port number and the first port number respectively being positive integers; the second port number is equal to a number of non-zero power transmission antenna ports of a PUSCH bearing the first signal, while the first port number is associated with the first reference signal resource.

In one embodiment, the first information block comprises S information sub-blocks, the S information sub-blocks being sequentially arranged in the first information block; the S information sub-blocks respectively indicate the S matrix sets; a first information sub-block among the S information sub-blocks indicates the first matrix set; the S reference signal resource sets are sequentially arranged; a position of the first information sub-block in the S information sub-blocks is the same as a position of the first reference signal resource set in the S reference signal resource sets.

In one embodiment, the first signal comprises L sub-signals, where L is a positive integer greater than 1; the L sub-signals occupy same time-frequency resources; there are two sub-signals among the L sub-signals that have different transmit powers.

In one embodiment, the second node is a base station.

In one embodiment, the second node is a UE.

In one embodiment, the second node is a relay node.

In one embodiment, the second receiver 1801 comprises at least one of the antenna 420, the receiver 418, the receiving processor 470, the multi-antenna receiving processor 472, the controller/processor 475 or the memory 476 in Embodiment 4.

In one embodiment, the second transmitter 1802 comprises at least one of the antenna 420, the transmitter 418, the transmitting processor 416, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, vehicles, automobiles, RSU, wireless sensor, network cards, terminals for Internet of Things (JOT), RFID terminals, NB-JOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, Road Side Unit (RSU), drones, test equipment like transceiving device simulating partial functions of base station or signaling tester.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling; and
a first transmitter, transmitting a first signal;
wherein the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

2. The first node according to claim 1, wherein the first transmitter transmits a first information block; wherein the first information block indicates the S matrix sets.

3. The first node according to claim 2, wherein the first receiver receives a second information block; wherein as a response to the behavior of receiving the second information block, the first node transmits the first information block.

4. The first node according to claim 1, wherein the first signaling comprises a first field, and the first field in the first signaling comprises two sub-fields; a target sub-field of the two sub-fields in the first signaling indicates the first reference signal resource; a position of the target sub-field in the two sub-fields is used to determine the first matrix set, any of the two sub-fields comprising at least one bit.

5. The first node according to claim 1, wherein when the first matrix belongs to the first matrix set, the first coefficient is equal to 1; when the first matrix does not belong to the first matrix set, the first coefficient is equal to a ratio of a second port number to a first port number, the second port number and the first port number respectively being positive integers; the second port number is equal to a number of non-zero power transmission antenna ports of a PUSCH bearing the first signal, while the first port number is associated with the first reference signal resource.

6. The first node according to claim 2, wherein the first information block comprises S information sub-blocks, the S information sub-blocks being sequentially arranged in the first information block; the S information sub-blocks respectively indicate the S matrix sets; a first information sub-block among the S information sub-blocks indicates the first matrix set; the S reference signal resource sets are sequentially arranged; a position of the first information sub-block in the S information sub-blocks is the same as a position of the first reference signal resource set in the S reference signal resource sets.

7. The first node according to claim 1, wherein the first signal comprises L sub-signals, L being a positive integer greater than 1; the L sub-signals occupy same time-frequency resources; there are two sub-signals among the L sub-signals that have different transmit powers.

8. A second node for wireless communications, comprising:
a second transmitter, transmitting a first signaling; and
a second receiver, receiving a first signal;
wherein the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

9. The second node according to claim 8, wherein the second receiver receives a first information block; wherein the first information block indicates the S matrix sets.

10. The second node according to claim 9, wherein the second transmitter transmits a second information block; wherein as a response to the behavior of receiving the second information block, a transmitter for the first signal transmits the first information block.

11. The second node according to claim 8, wherein the first signaling comprises a first field, and the first field in the first signaling comprises two sub-fields; a target sub-field of the two sub-fields in the first signaling indicates the first reference signal resource; a position of the target sub-field in the two sub-fields is used to determine the first matrix set, any of the two sub-fields comprising at least one bit.

12. The second node according to claim 8, wherein when the first matrix belongs to the first matrix set, the first coefficient is equal to 1; when the first matrix does not belong to the first matrix set, the first coefficient is equal to a ratio of a second port number to a first port number, the second port number and the first port number respectively being positive integers; the second port number is equal to a number of non-zero power transmission antenna ports of a PUSCH bearing the first signal, while the first port number is associated with the first reference signal resource.

13. The second node according to claim 9, wherein the first information block comprises S information sub-blocks, the S information sub-blocks being sequentially arranged in the first information block; the S information sub-blocks respectively indicate the S matrix sets; a first information sub-block among the S information sub-blocks indicates the first matrix set; the S reference signal resource sets are sequentially arranged; a position of the first information sub-block in the S information sub-blocks is the same as a position of the first reference signal resource set in the S reference signal resource sets.

14. The second node according to claim 8, wherein the first signal comprises L sub-signals, L being a positive integer greater than 1; the L sub-signals occupy same time-frequency resources; there are two sub-signals among the L sub-signals that have different transmit powers.

15. A method in a first node for wireless communications, comprising:
receiving a first signaling; and
transmitting a first signal;
wherein the first signaling is used to determine scheduling information for the first signal; a transmit power for the first signal is a first power, and a linear value of the first power is equal to a product of a linear value of a second power and a first coefficient, the first coefficient being a non-negative real number; the first signaling is used to determine a first reference signal resource and a first matrix; the first reference signal resource is used to determine a spatial relation of the first signal; the first reference signal resource is a reference signal resource in a first reference signal resource set, the first reference signal resource set is one of S reference signal resource sets, S being a positive integer greater than 1, any of the S reference signal resource sets comprises at least one reference signal resource; S matrix sets respectively correspond to the S reference signal resource sets, any of the S matrix sets comprises at least one matrix; a first matrix set is a matrix set corresponding to the first reference signal resource set among the S matrix sets, whether the first matrix belongs to the first matrix set is used to determine the first coefficient.

16. The method according to claim 15, comprising:
transmitting a first information block, wherein the first information block indicates the S matrix sets;
or, transmitting a first information block and receiving a second information block, wherein as a response to the behavior of receiving the second information block, the first node transmits the first information block.

17. The method according to claim 15, wherein the first signaling comprises a first field, and the first field in the first signaling comprises two sub-fields; a target sub-field of the two sub-fields in the first signaling indicates the first reference signal resource; a position of the target sub-field in the two sub-fields is used to determine the first matrix set, any of the two sub-fields comprising at least one bit.

18. The method according to claim 15, wherein when the first matrix belongs to the first matrix set, the first coefficient is equal to 1; when the first matrix does not belong to the first matrix set, the first coefficient is equal to a ratio of a second port number to a first port number, the second port number and the first port number respectively being positive integers; the second port number is equal to a number of non-zero power transmission antenna ports of a PUSCH bearing the first signal, while the first port number is associated with the first reference signal resource.

19. The method according to claim 16, wherein the first information block comprises S information sub-blocks, the S information sub-blocks being sequentially arranged in the first information block; the S information sub-blocks respectively indicate the S matrix sets; a first information sub-block among the S information sub-blocks indicates the first matrix set; the S reference signal resource sets are sequentially arranged; a position of the first information sub-block in the S information sub-blocks is the same as a position of the first reference signal resource set in the S reference signal resource sets.

20. The method according to claim 15, wherein the first signal comprises L sub-signals, L being a positive integer greater than 1; the L sub-signals occupy same time-frequency resources; there are two sub-signals among the L sub-signals that have different transmit powers.

* * * * *